(12) United States Patent
Cartmell et al.

(10) Patent No.: US 7,337,910 B2
(45) Date of Patent: Mar. 4, 2008

(54) METHODS AND DEVICES FOR RESPONDING TO REQUEST FOR UNREGISTERED DOMAIN NAME TO INDICATE A PREDEFINED TYPE OF SERVICE

(75) Inventors: Brian Cartmell, Seattle, WA (US);
Jothan Frakes, Normandy Park, WA (US)

(73) Assignee: Verisign, Inc., Mountain View, CA (US)

( * ) Notice: Subject to any disclaimer, the term of this patent is extended or adjusted under 35 U.S.C. 154(b) by 720 days.

(21) Appl. No.: 09/971,018

(22) Filed: Oct. 4, 2001

(65) Prior Publication Data

US 2002/0138649 A1    Sep. 26, 2002

Related U.S. Application Data

(60) Provisional application No. 60/237,849, filed on Oct. 4, 2000.

(51) Int. Cl.
*G06F 13/00* (2006.01)
(52) U.S. Cl. .................................................. 209/245
(58) Field of Classification Search ................ 707/1, 707/2, 4; 709/203, 245
See application file for complete search history.

(56) References Cited

U.S. PATENT DOCUMENTS

| | | | |
|---|---|---|---|
| 5,452,459 | A | 9/1995 | Drury et al. |
| 5,828,833 | A | 10/1998 | Belville et al. |
| 5,862,325 | A | 1/1999 | Reed et al. |
| 5,893,106 | A | 4/1999 | Brobst et al. |
| 6,044,205 | A | 3/2000 | Reed et al. |
| 6,088,717 | A | 7/2000 | Reed et al. |
| 6,154,738 | A * | 11/2000 | Call .............................. 707/4 |

OTHER PUBLICATIONS

"SkyTel Products/Services," SkyTel Communications, Inc., 2000, http://www.skytel.com/products/Services_SkyWordInfo.htm, 2 pages [Accessed Sep. 7, 2000].
"Track by Tracking Number," United Parcel Service of America, Inc., 1994-2000, http://www.ups.com/tracking/tracking.html, 2 pages [Accessed Sep. 6, 2000].
"Track Shipments," Federal Express Corporation, 1995-2000, http://www.fedex.com/us/tracking, 1 page [Accessed Sep. 6, 2000].

* cited by examiner

*Primary Examiner*—Robert B. Harrell
(74) *Attorney, Agent, or Firm*—Townsend and Townsend and Crew LLP

(57) ABSTRACT

A method, system, and computer-readable medium is described that provides one or more types of services and/or information in response to an information request or other message that specifies a unique identifier of a defined type. The information requests can include requests for resources corresponding to specified URLs with domain names that include a unique identifier, and if so the service or information provided can be based on the defined type of the identifier and/or on an item corresponding to the unique identifier. Additional information included in header fields of HTTP messages used for such URL requests can also be used to determine services or information to be provided, either instead of or in addition to the specified domain name identifier. In addition, services and information can be provided for a requested URL that includes a domain name that has not been explicitly registered with the DNS name server computers.

56 Claims, 18 Drawing Sheets

Example Configuration Data File for the Primary Name Server of the foo.IBM.com Zone

| | | | |
|---|---|---|---|
| 205 | primary | foo.IBM.com | db.foo.IBM |
| 210 | primary | stanford.edu | db.stanford |
| | ⋮ | | |

*Figure 2A*

Example db.foo.IBM Zone Data File for the foo.IBM.com Zone foo.IBM.com.   IN SOA   ns1.WebHostingCompany.com.   postmaster.WebHostingCompany.com. ( ;;; information for slave name servers
                        1837           ;;; serial number for this version of the zone data file
                        1800           ;;; refresh after 30 minutes
                        900            ;;; retry after 15 minutes
                        86400         ;;; expire after 1 week
                        1800           ;;; minimum Time To Live (TTL) of 30 minutes
                        )

;;; name servers for the zone
                IN       NS       ns1.WebHostingCompany.com.
                IN       NS       bar ;;; mail server
                IN       MX       5   mailserver.WebHostingCompany.com.

;;; addresses
    @           IN       A        216.23.39.188
    foo        IN       A        216.23.39.180
    bar        IN       A        216.23.46.83

;;; aliases
    smtp       IN   CNAME    @
    www        IN   CNAME    @
    ftp         IN   CNAME    foo.foo.IBM.com.
    bigdaddy   IN   CNAME    bar

*Figure 2B*

Example Partial Zone Data File for the IBM.com Zone

;;; delegation of subzone foo.IBM.com to authoritative name servers for the subzone
foo                86400   IN   NS    ns1.WebHostingCompany.com.
                     86400   IN   NS    bar.foo.IBM.com.
bar.foo.IBM.com.   86400   IN   A     216.23.46.83

*Figure 2C*

Example DNS Domain Name Group Mapping Database

330

| | Domain Name Group Specification Expression | Text Description | Group ID | IP Address |
|---|---|---|---|---|
| 342 | 000000000000–999999999999 | All UPC Version A codes – 12 digits long, no separators, any digit at any position (although 1, 8, and 9 are reserved for digit 1) | 132497 | 225.71.83.242 |
| 344 | (001–999)-(00–99)-(0000–9999) | Social Security Numbers from 001-00-0000 to 999-99-9999 | 232123 | 225.71.32.138 |
| 346 | 1-8(00\|88)-555-[0-9][0-9][0-9][0-9] | Some Toll-Free US Telephone Numbers – matches 800 and 888 numbers with 555 central office code | 625233 | 225.71.32.45 |
| 348 | (1-)?[2-9][0-9]-[2-9][0-9][0-9]-[0-9][0-9][0-9][0-9] \| (1 )?\([2-9][0-9][0-9]\) [2-9][0-9][0-9]-[0-9][0-9][0-9][0-9] | US Telephone Numbers – matches 1 (NXX) NXX-XXXX or 1-NXX-NXX-XXXX, where the leading 1 is optional, X is any digit and N is 2-9 | 625234 | 225.71.32.45 |
| 350 | 911-emergency; *.911 | 911 Emergency Services | 625282 | 225.71.32.44 |
| 352 | ([a-z]\|[A-Z])+(-([a-z]\|[A-Z])*[a-z]\|[A-Z])*\. ([a-z]\|[A-Z])+((-\|)([a-z]\|[A-Z]))*([a-z]\|[A-Z])*(\.([a-z]\|[A-Z]))? | Last Name.First Name.Initial – ".Initial" is optional, and allows characters a-z (either uppercase or lowercase), "-" in middle portions of both names, and spaces in middle portions of the first name | 328234 | 225.71.35.15 |
| 354 | *-*-*-* | All ISBN codes – matches any alphanumeric identifier with at least three dashes (a '*' matches any number of alphanumeric characters in this example) note: ensure that more specific expressions that would also match this (e.g., credit card numbers) occur earlier in the db | 957562 | 225.71.83.242 |
| | ... | | | |

*Fig. 3C*

HTTP_X_UP_SUBNO =

HTTP_UP_SUBNO =

HTTP_SUBNO =

REMOTE_ADDR = 207.109.65.66

REQUEST_METHOD = GET

REMOTE_HOST = 207.109.65.66

QUERY_STRING =

HTTP_USER_AGENT = Mozilla/4.0 (compatible; MSIE 5.01; Windows NT; AT&T WNS5.0)

HTTP_ACCEPT = application/msword, application/vnd.ms-excel, application/vnd.ms-powerpoint, image/gif, image/x-xbitmap, image/jpeg, image/pjpeg, application/x-comet, application/pdf, */*

REMOTE_PORT = 9043

HTTP_ACCEPT_LANGUAGE = en-us

HTTP_CACHE_CONTROL = max-stale=0

HTTP_ACCEPT_ENCODING = gzip, deflate

SERVER_NAME = 731944151120.cc

REQUEST_URI =

SERVER_PORT = 80

HTTP_HOST = 731944151120.cc

*Fig. 3D*

REMOTE_ADDR = 207.109.65.66

REQUEST_METHOD = GET

REMOTE_HOST = 207.109.65.66

QUERY_STRING =

HTTP_USER_AGENT = Mozilla/4.5 [en] (WinNT; I)

HTTP_CONNECTION = Keep-Alive

HTTP_ACCEPT = image/gif, image/x-xbitmap, image/jpeg, image/pjpeg, image/png, */*

REMOTE_PORT = 8222

HTTP_ACCEPT_LANGUAGE = en,pdf

SCRIPT_NAME =

HTTP_ACCEPT_ENCODING = gzip

SCRIPT_FILENAME =

SERVER_NAME = 731944151120.cc

REQUEST_URI =

HTTP_ACCEPT_CHARSET = iso-8859-1,*,utf-8

SERVER_PORT = 80

HTTP_HOST = 731944151120.cc

*Fig. 3E*

Example Identifier URL Response Database 360

| | Identifier Group Specification Expressions 362 | Text Description 364 | Response 366 |
|---|---|---|---|
| 372 | 000000000000---999999999999 | UPC Version A codes – 12 digits long, no separators, any digit at any position (although 1, 8, and 9 are reserved for digit 1) | Reply:<br>"HTTP/1.1 303 See Other<br>Date:" <current-date> "<br>Server: Apache/1.3a1<br>Gateway-Interface: CGI/1.1<br>Location: http://www.MEGASTORE.com/isapi.dll?Command=search.exe&<br>SearchString=" <header-value> |
| 374 | *-*-*-* | All ISBN codes – matches any alphanumeric identifier with at least three dashes (a '*' matches any number of alphanumeric characters in this example) | Execute: ISBN-price-comparison-page-generator-program.exe --argument <header-value> |
| 376 | [a-Z][a-Z][a-Z]+-sell-[0-9]+ | Stock Sell At Default Brokerage – matches stock symbol, followed by a "sell" order and the number of shares, and then by a TLD (e.g., MSFT-sell-1000) | Execute: stock-sell-program.exe --arg1 <header-value> --brokerage_arg "default";<br>Reply:<br>"HTTP/1.1 200 OK<br>Content-type: text/html<br>Content-length: 113<br><title>Stock Sell</title><br>Your market sell order will be processed as soon as possible at your default brokerage." |
| 378 | [a-Z][a-Z][a-Z]+-sell-[0-9]+-[a-Z]+ | Stock Sell At Specified Brokerage – matches stock symbol, followed by a "sell" order, number of shares, and brokerage identifier (e.g., MSFT-sell-100-Schwab) | Execute: stock-sell-program.exe --arg1 <header-value> --brokerage_arg "specified";<br>Reply:<br>"HTTP/1.1 200 OK<br>Content-type: text/html<br>Content-length: 114<br><title>Stock Sell</title><br>Your market sell order will be processed as soon as possible at the specified brokerage." |
| | ... | | |

*Fig. 3F*

Example DSIP-Generated Interactive User-Preference Web Page

You have requested the URL "731944151120.cc", which includes an identifier of a type that matches both UPC Version A codes and XYZ shipping codes that are informally illustrated without interior dashes. Please select an option below that indicates your preferred response and then select the "Submit" button, or instead select the "Cancel Request" button to return to the previously displayed Web page. To use your indicated preferred response for future requests for identifiers of this type, indicate to store the preference before selecting the "Submit" button.

☐ Perform default server behavior for this type of identifier.

Treat identifier as a UPC Version A code identifying an item and:
☐ Locate a Web page from which the item can be acquired for a lowest possible price.
☐ Locate a Web page from which the item can be acquired from a preferred provider.
☐ Summarize Web pages from which the item can be acquired.
☐ Locate a Web page with product specifications for this item.
☐ Locate a Web page comparing this item to related items.
☐ Locate a Web page for the manufacturer of this item.
☐ Acquire item for lowest possible price using stored payment information.

Treat identifier as an XYZ shipping code identifying a shipment by one of several shipping companies and:
☐ Locate a Web page which provides the status of this shipment from the most likely shipping company.
☐ Summarize Web pages from each shipping company having a matching shipment.

☐ Store this preference for this identifier type, and do not present this Preference Web Page again for future requests?

[ Submit ]     [ Cancel Request ]

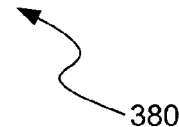

*Fig. 3G*                                        380

Example db.CC Zone Data File for a ".CC" Zone

| | | | | | |
|---|---|---|---|---|---|
| cc. | IN | SOA | ns1.nic.cc. | postmaster.nic.cc. | ( |

;;; information for slave name servers

| | | |
|---|---|---|
| | 1837 | ;;; serial number for this version of the zone data file |
| | 1800 | ;;; refresh after 30 minutes |
| | 900 | ;;; retry after 15 minutes |
| | 86400 | ;;; expire after 1 week |
| | 1800 | ;;; minimum Time To Live (TTL) of 30 minutes |
| | ) | |

;;; name servers for the zone

| | | | |
|---|---|---|---|
| | IN | NS | ns1.nic.cc. |
| | IN | NS | ns2.nic.cc. |
| | IN | NS | ns1.globaldns.com. |

;;; addresses

| | | | |
|---|---|---|---|
| @ | IN | A | 226.23.39.188 |
| alpha | IN | A | 225.78.83.242 |
| amethyst-rings | IN | A | 178.123.32.138 |
| ⋮ | | | |
| ns1.nic | IN | A | 225.31.53.23 |
| ⋮ | | | |
| race | IN | A | 225.31.32.45 |
| reckless | IN | A | 67.79.35.15 |
| ⋮ | | | |
| * | IN | A | 225.71.83.242 |

METHODS AND DEVICES FOR RESPONDING TO REQUEST FOR UNREGISTERED DOMAIN NAME TO INDICATE A PREDEFINED TYPE OF SERVICE

CROSS REFERENCE TO RELATED APPLICATION

This application claims the benefit of U.S. Provisional Application No. 60/237,849, filed Oct. 4, 2000, which is hereby incorporated by reference in its entirety.

TECHNICAL FIELD

The following disclosure relates generally to responding to a request, and more particularly to providing various services and information based on a specified request that includes a unique identifier.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, the domain name for a hypothetical computer system operated by IBM Corporation may be "comp23.IBM.com". Using domain names, a user attempting to communicate with this computer system could specify a destination of "comp23.IBM.com" rather than the particular IP address of the computer system (e.g., 198.81.209.25).

A user can also request a particular resource (e.g., a Web page or a file) that is available from a server computer by specifying a unique Universal Resource Indicator ("URI"), such as a Uniform Resource Locator ("URL"), for that resource. A URL includes a protocol to be used in accessing the resource (e.g., "http:" for the HyperText Transfer Protocol ("HTTP")), the domain name or IP address of the server that provides the resource (e.g., "comp23.IBM.com"), and optionally a path to the resource (e.g., "/help/HelpPage.html")—thus "http://comp23.IBM.com/help/HelpPage.html" is one example of a URL. In response to a user specifying such a URL, the comp23.IBM.com server would typically return a copy of the "HelpPage.html" file to the user.

The domain names in DNS are structured in a hierarchical, distributed database that facilitates grouping related domain names and computers. In particular, as mentioned above, a particular domain name such as "IBM.com" may identify a specific host computer. However, the hierarchical nature of DNS also allows a domain name such as "IBM.com" to represent a domain including multiple other domain names each identifying computers (also referred to as "hosts"), either in addition to or instead of identifying a specific computer. FIG. 1 illustrates a hypothetical portion of the DNS database 100 in which the node representing the IBM.com domain name 110 is the root node in an IBM.com domain 150 that includes 7 other nodes each representing other domain names. Each of these domain names in the IBM.com domain can be, but do not have to be, under the control of a single entity (e.g., IBM Corporation). FIG. 1 also includes a WebHostingCompany.com domain 155 that includes a single domain name.

As is illustrated, the DNS database can be represented with a hierarchical tree structure, and the full domain name for a given node in the tree can be determined by concatenating the name of each node along the path from the given node to the root node 101, with the names separated by periods. Thus, the 8 nodes in the IBM.com domain represent the domain names IBM.com 110, foo.IBM.com 112, foo.foo.IBM.com 118, bar.foo.IBM.com 120, bar.IBM.com 114, comp 23.IBM.com 116, abc.comp23.IBM.com 122, and cde.comp23.IBM.com 124. Other ".com" domain names outside the IBM.com domain are also illustrated in FIG. 1, including the second-level domain names BCD-Corp.com 132, WebHostingCompany.com 134, 1-800-555-1212.com 142 and 123456.com 144, and the lower-level domain names 123.123456.com 146 and 456.123456.com 148. In addition to the ".com" top-level domain ("TLD"), other TLDs are also illustrated including the ".cc" geographical TLD and the ".gov", ".edu" and ".mil" organizational TLDs. Illustrated domain names under these other TLDs include Stanford.edu 136, Berkeley.edu 138, and RegistrarCompany.cc 140.

To facilitate the translating of DNS domain names to IP addresses, a network of domain name server computer systems ("domain name servers") that maintain mappings from domain names to IP addresses is distributed throughout the Internet. For any particular domain name, at least one domain name server is designated as being authoritative for that particular domain name and can determine one or more IP addresses to which the particular domain name should be mapped. When another computer requests the one or more IP addresses for a domain name, an authoritative domain name server for that domain name can then make the appropriate IP addresses available to the requestor. A piece of software that is commonly used to implement the DNS protocols is the Berkeley Internet Name Domain ("BIND") software, available from the Internet Systems Consortium. This software assists authoritative domain name servers to maintain the appropriate mapping information for domain names, and also assists other computers in identifying the domain name servers that are authoritative for a domain name when needed.

Each domain name will have one authoritative name server that is designated as the primary master name server ("primary name server") for that domain name, and the primary name server will have control over the stored information (including the IP addresses) for that domain name. Rather than being associated directly with domain names, each name server is actually associated with one or more zones of domain names, with each zone including one or more related domain names. Thus, the primary name server for a zone will store various information about the domain names in that zone in a zone data file. If there are additional non-primary name servers that are authoritative for the domain name, these name servers are referred to as "slave name servers," and they obtain their domain name information from the appropriate primary name server. Zone data files typically include information indicating the primary name server for the zone, slave name servers for the zone, domain name-to-IP address mappings for each domain name in the zone, domain name aliases that represent other domain names in the zone, and a serial number indicating a version of the zone data file. Each entry in the zone data file is referred to as a DNS resource record. A primary or slave name server for a zone can be a host computer associated with one of the domain names in the zone, or can instead be associated with a domain name located elsewhere in the DNS database hierarchy.

Thus, in order for a client computer to request a resource that is indicated by a URL containing a domain name, the client first determines the appropriate IP address for the domain name from one of the authoritative name servers for the zone that includes the domain name. After the name server provides the IP address to the client, the client can then use that information to contact the server computer with that IP address and request that the server provide the resource corresponding to the URL.

However, in order to obtain the IP information that corresponds to a domain name, the client computer needs to be able to identify an authoritative name server for the domain name. Requests to identify an authoritative name server for a domain name are resolved by DNS in a hierarchical manner. In particular, one or more root name servers maintain information about the authoritative name servers for each of the TLDs (e.g., ".com" and ".cc"). In response to requests, those TLD name servers can then provide information about the authoritative name servers for the second-level domains—for example, an authoritative name server for the ".com" TLD will know the authoritative name servers for the second-level IBM.com domain. Continuing in this hierarchical manner as necessary, the authoritative name servers for the domain name of interest can be identified.

The manner in which the TLD name servers obtain and store information about the second-level domains varies for different TLDs, and is affected by the domain name registrars for the TLDs. In particular, a company that serves as a registrar for a TLD assists customers in registering new domain names for that TLD and performs the necessary actions so that the technical DNS information for those domain names is stored in a manner accessible to the name servers for that TLD. Registering a domain name includes creating DNS resource records for the domain name that are stored in an appropriate location, such as a new zone file corresponding to the new domain name or in an existing zone file. Registrars often maintain a second-level domain name within the TLD (e.g., a hypothetical Registrar Company that acts as a registrar for the ".cc" TLD could maintain the RegistrarCompany.cc domain name 140), and provide an interactive Website at their domain name from which customers can register new domain names.

For the ".com", ".net" and ".org" TLDs, a large number of registrars currently exist, and a single shared registry ("the Registry") under the control of a third-party administrator stores information identifying the authoritative name servers for the second-level domain names in those TLDs. Thus, each of the registrars supplies the appropriate name server information to be stored in the Registry for the second-level domain names that they register, and the authoritative name servers for these TLDs obtain the delegation information about the second-level domains' authoritative name servers from the Registry. In this shared registry arrangement, the administrator of the Registry charges each registrar a fee when the registrar registers a new second-level domain name.

Other TLDs may have only a single registrar, and if so that registrar could maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD—if so, the secondary or affiliate registrars for that TLD supplies the appropriate DNS information for the domain names that they register to the primary registrar. Thus, the manner in which the DNS information for a TLD is obtained and stored is affected by the registrars for that TLD.

In addition to registering new domain names, registrars are also responsible for maintaining administrative information (also referred to as "whois data" or a DNS whois record) about their domain names that identifies the current administrative contact for the domain name, and can include additional information such as the "registrant" (ie., owner) of the domain name, when the domain name was first created and when the administrative information was last modified.

Thus, the registering of new second-level domain names includes specifying a primary name server for the domain name, with the primary name server typically storing the technical DNS information for the domain name in a zone data file as described above. In addition to using zone data files, a primary name server typically also uses a configuration file that lists each zone for which the name server is responsible and the zone data file for that zone.

As an illustrative example, consider a zone that includes domain names foo.IBM.com 112, foo.foo.IBM.com 118, and bar.foo.IBM.com 120. FIG. 2A provides one example of a configuration file for the name server that is the primary name server for the foo.IBM.com zone, as is indicated in line 205 of the file. As is shown in the DNS configuration record in line 205, the zone data file for the foo.IBM.com is named "db.foo.IBM". In the illustrative example, the name server is also shown in the second DNS configuration record at line 210 to be the primary name server for the stanford.edu zone. Thus, when this name server begins to execute, it will read each of the listed zone data files to obtain the zone information for those zones. Those skilled in the art will appreciate that different formatting may be used for a configuration file in different situations, such as for different versions of the BIND software.

FIG. 2B illustrates an example of a possible db.foo.IBM zone data file for the foo.IBM.com zone. As those skilled in the art will appreciate, the second and third DNS resource records in the zone data file indicate that a computer with the domain name ns1.WebHostingCompany.com (not illustrated in FIGS. 1A and 1B) is the primary name server for the foo.IBM.com zone, and that a computer with the bar.foo.IBM.com domain name is a slave name server. Other DNS resource records include a variety of other DNS information about the foo.IBM.com zone.

As mentioned above, an authoritative name server for a zone maintains information on the authoritative name servers for subzones of the zone. Thus, the authoritative name servers for the IBM.com zone need to maintain information to allow them to delegate requests about the foo.IBM.com subzone to the primary and slave name servers for that subzone, namely ns1.WebHostingCompany.com and bar- .foo.IBM.com respectively. The zone data file for the IBM-.com zone could include the additional entries illustrated in FIG. 2C to delegates requests about the foo.IBM.com zone to the ns1.WebHostingCompany.com and bar.foo.IBM.com domain names.

Additional details about DNS and the Bind software are available in "DNS and Bind, Third Edition" by Paul Albitz & Cricket Liu, 1998, O'Reilly & Associates Publishing, Sebastopol, Calif. 95472, which is hereby incorporated by reference in its entirety.

As indicated, requests to retrieve a Web resource identified with a URL often use the HTTP protocol. In particular, to request a resource, a Web browser will typically establish a connection with the server computer indicated in the URL, and will then send to the server an HTTP Request message (e.g., using the "GET" method) for the resource indicated by the URL. The server will typically reply with an HTTP Response message that contains the requested resource. After one or more such Request-Response message pairs are exchanged, the connection between the browser and the server computer is closed. In addition to other information included in HTTP messages, the messages can include various HTTP header fields that consist of a name followed by a colon and an optional field value (e.g., "HTTP$_{13}$ HOST: comp23.IBM.com" when the URL "http://comp23.IBM.com/help/HelpPage.html" is requested). There are a variety of header fields defined by the HTTP protocol standard for use in providing additional information or instructions to the message recipient, and other non-standard header fields can also be used if the sender and recipient share an understanding of how to interpret those header fields.

Additional details about HTTP are available in "Hypertext Transfer Protocol—HTTP/1.1—Draft Standard RFC 2616"(June 1999) and in "Hypertext Transfer Protocol—HTTP/1.0—RFC 1945"(May 1996), both prepared by the World Wide Web Consortium's Network Working Group, and both of which are hereby incorporated by reference in their entirety.

While the DNS system and HTTP protocol provide many benefits, various problems exist. For example, if it is desirable to provide domain name-to-IP address mappings for very large numbers of domain names (e.g., millions or billions of second-level domain names), it is typically necessary to register each such domain name with a registrar for the appropriate TLD. In addition to the costs associated with such registering, the registry for the appropriate TLD maintains entries for each domain name, and thus uses significant storage space and has related maintenance and administrative costs. Moreover, this problem with providing domain name-to-IP address mappings becomes intractable if the specific domain names of interest cannot be identified in advance of requests for such domain names so that those domain names can be registered.

In addition to the problems with registering and storing very large numbers of IP address mappings for domain names, problems also exist for users of the Web and the DNS system who wish to obtain desired information or receive desired services. In particular, while it may be possible to identify a Website that corresponds to a particular company of interest (e.g., a user may be able to guess that the domain name "IBM.com" will provide information related to the IBM Corporation), it is much more difficult to identify an appropriate source for information or a service that is not directly related to a particular company. For example, to identify information about a particular telephone number (e.g., to do a reverse-lookup and identify the person associated with the telephone number), it would be necessary to identify a Website that could provide such a service. Even if the appropriate telephone company that is responsible for the phone number could be identified (which may be very difficult to do), and a Website for the company could be identified (which may not be possible based on mere guessing), that company may not provide a Website with the information of interest. Moreover, even if some third party was able to provide the information or service of interest, it may be difficult or impossible for an inexperienced Web user (or even for an experienced user) to identify the Website of that third party.

BRIEF DESCRIPTION OF THE DRAWINGS

FIGS. 2A-2C are examples of DNS data files.

FIGS. 3A-3H illustrate a use of an example Dynamic Service/Information Provider system to obtain services based on a URL request.

DETAILED DESCRIPTION

Figure 1:
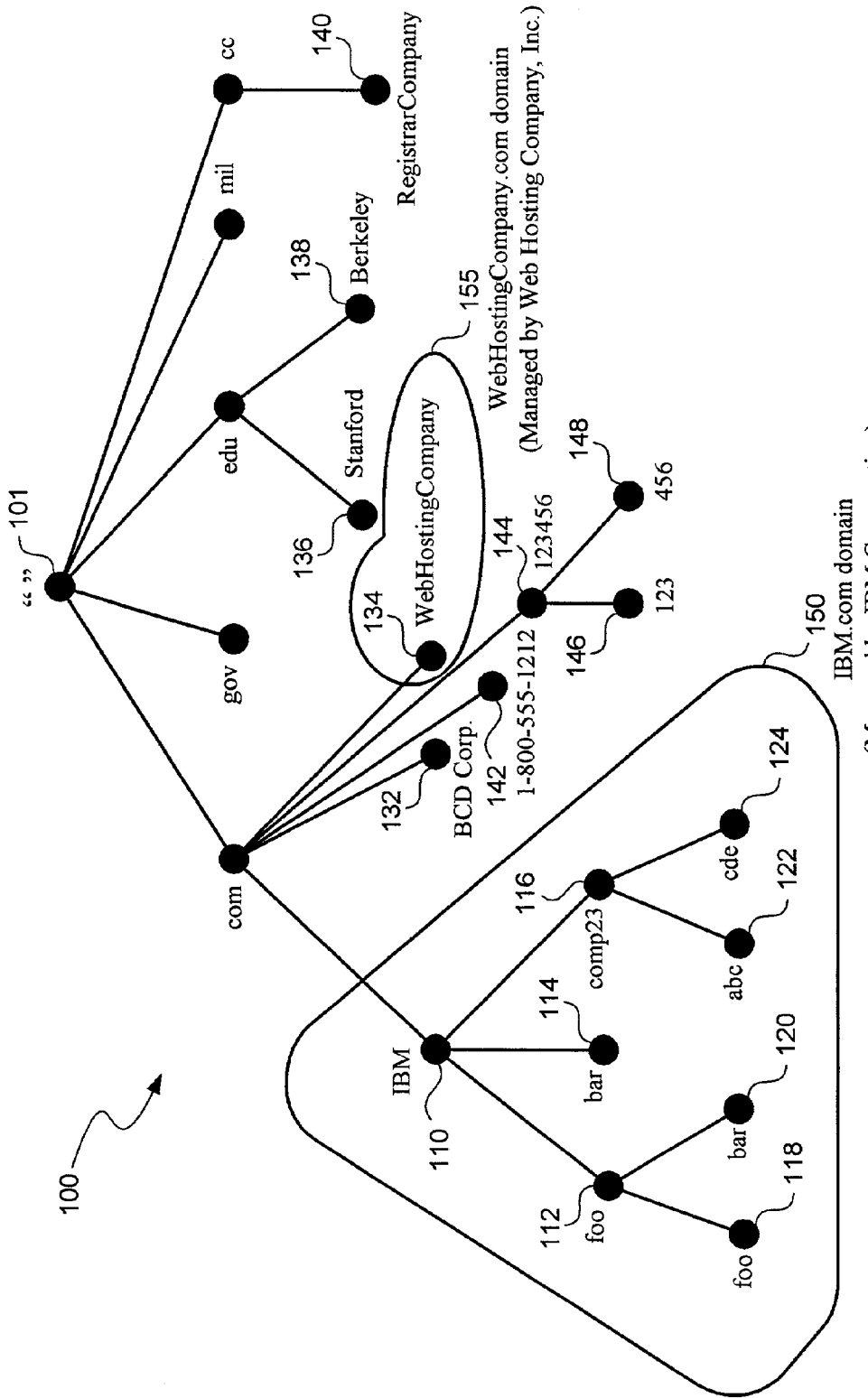
FIG. 1 is a network diagram illustrating interconnected network devices and Domain Name System (DNS) information.

A software facility is described below that provides one or more types of services and/or information in response to an information request (e.g., for a URI) or other message that specifies a unique identifier of a defined type. In some embodiments, the information requests are each for a resource corresponding to a specified URL having a domain name that includes the unique identifier (referred to as an "Identifier URL"), and the service or information provided is based on the defined type of the identifier and/or on an item corresponding to the unique identifier. Additional information included in header fields of an HTTP message used for such a URL request can also be used in some embodiments to determine services or information to be provided, either instead of or in addition to the specified domain name identifier. In addition, in some embodiments, services and information are provided for a requested Identifier URL that includes a domain name that has not been explicitly registered with the DNS name server computers.

For illustrative purposes, some embodiments of the software facility are described below in which groups of related DNS domain names are defined and in which various services or information is provided based on requests for information associated with members of those groups. In addition, some embodiments use information included in HTTP message header fields when requesting a URL. However, those skilled in the art will appreciate that the techniques of the invention can be used in a wide variety of other situations, some of which are discussed below, including mechanisms for responding to requests other than DNS and mechanisms for supplying information related to a request other than HTTP message header fields.

In particular, the Dynamic Service/Information Provider (DSIP) system is an example embodiment of the software facility in which one or more groups having multiple lower-level domain name members (i.e., domain names having more than just a TLD portion such as ".com", including second-level domain names such as "IBM.com" that have second-level domain name portions such as "IBM") are defined in a manner that does not require explicit identification of each group member. Each group is then associated with an authoritative name server for a domain (e.g., a TLD) that contains the multiple lower-level domain names. When a user of a client device specifies a URL that includes one of the lower-level domains, the client first requests the authoritative name server for the domain containing the lower-level domain to supply the IP address corresponding to the lower-level domain name. When the name server receives the request, the name server determines the group to which the lower-level domain name belongs, and then provides an IP address for a server computer that is associated with the group.

In some alternate embodiments, the defined groups are not registered within DNS or otherwise associated with name servers, but are instead associated with one or more other accessible server computers that can receive and process requests for URLs that include domain names that are members of the groups. In these embodiments, when a name server receives a request to map a group member domain name that is not registered to an IP address, the name server merely determines that the domain name is not registered and returns the IP address of one of the accessible server computers. Thus, in these embodiments the name server does not determine that the domain name is the member of any particular domain name group.

After the client computer receives the IP address for the server computer that is associated with the group, the client sends an HTTP Request message for the user-specified URL to the server computer. The server uses various information in the header fields of the HTTP message to determine the type of services and/or information to provide to the client, such as the particular lower-level domain name specified, the type of device of the client computer, the display size and capabilities of the client, the type of language displayed by the client, etc. The server may also determine the domain name group for the domain name included in the URL, and determine information and/or services associated with the domain name group. The server next determines how to respond to the received HTTP Request message based on the various available information, such as by providing information and/or services to the client. In particular, the server can identify or generate an appropriate Web page, and then provide that Web page to the client in an HTTP Response message. In embodiments in which the server receives URL requests that include any domain names that are not registered, the server may also respond to URLs with domain names that are not domain name group members by providing an indication of an error (e.g., an unregistered domain name or an unavailable resource corresponding to the URL).

In identifying or generating the appropriate Web page, the server may provide various types of functionality as discussed in greater detail below. In addition, the server can perform one or more types of services for the client that are also discussed in greater detail below, and can also provide status information to the client related to the services. Finally, after the client receives a Web page, the client presents the Web page to the user.

Figure 3A:
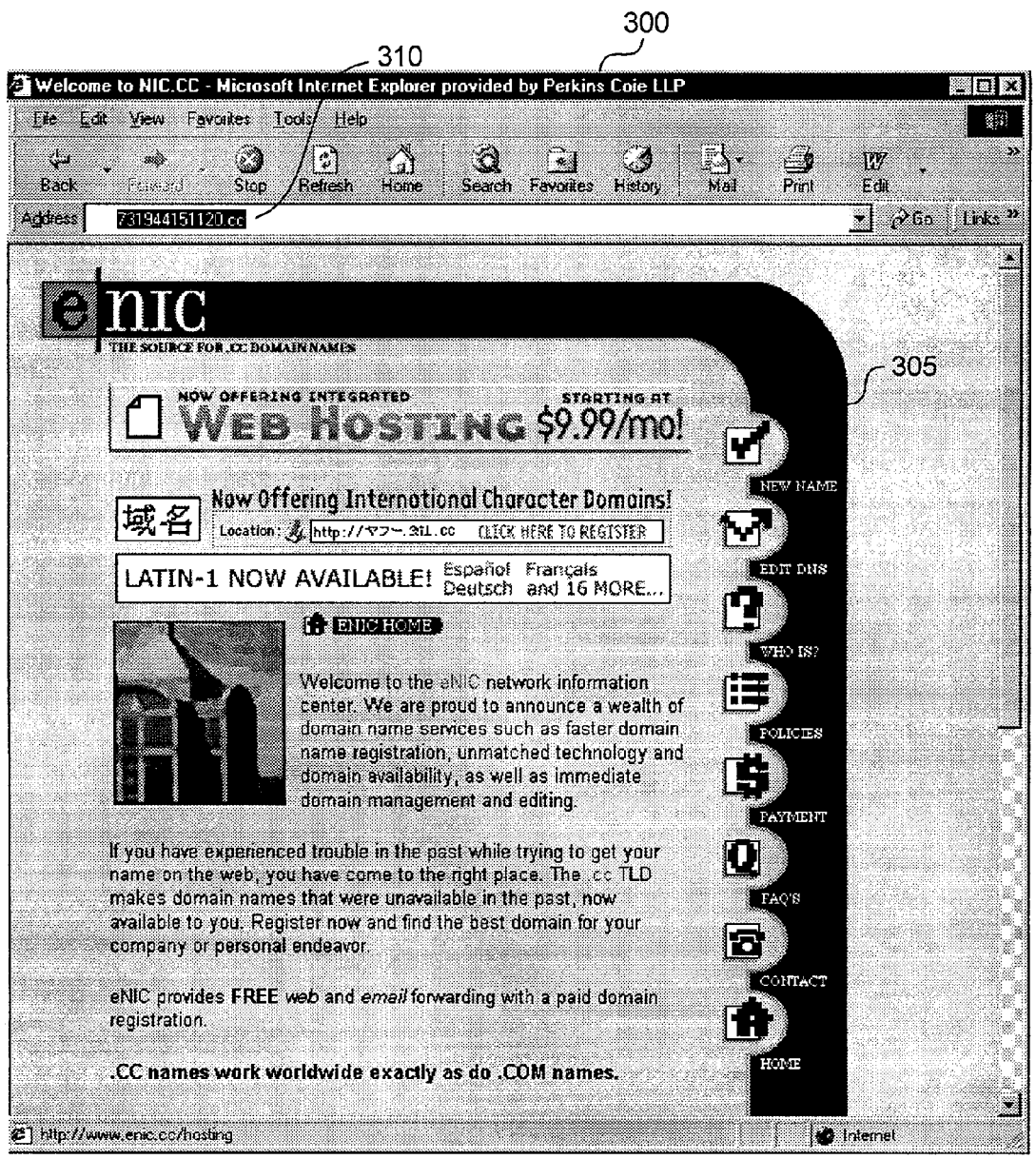

As an illustrative example of the use of the DSIP system, consider the Identifier URL request illustrated in FIG. 3A. In this example, a user is interacting with a Web browser program having a GUI 300 that is displayed on a client computer. The user is viewing a Web page 305 corresponding to the URL "http://www.nic.cc", and is in the process of making a request for a Web resource corresponding to the Identifier URL "731944151120.cc" (the HTTP protocol is used by default in this example when no protocol is specified in the URL). The user has begun the request by entering the Identifier URL in the user-editable "Address" field 310 of the browser, and will complete the request by indicating to retrieve the resource corresponding to the URL (e.g., by depressing the "Enter" key on the keyboard). Upon completing the request, the client computer will attempt to resolve the "731944151120.cc" domain name to determine its mapped corresponding IP address, and will then use the provided IP address to request a resource corresponding to the Identifier URL.

In the illustrated embodiment, the request by the user is an attempt to obtain information about an item for which the user has a Universal Product Code ("UPC") number. In particular, the user knows that the UPC number for an item of interest is "731944151120" (but may not know any other information about the item), and may desire one or more of a variety of types of information related to the item, such as physical locations where the user can acquire the item, a list or comparison of online Web pages from which the user can acquire the item, a particular Web page from which the item can be ordered (e.g., the one that has the lowest available price for the item or one from a preferred supplier), or other related information (e.g., the manufacturer, product specifications, and/or suggested retail price). The user may not know how to obtain desired information about the item using existing traditional Web functionality (e.g., search engines or known product-related Websites), and so the user instead can enter the UPC number followed by an appropriate TLD (which can be determined by the user as discussed below). Alternately, the user may know how to obtain the desired information using existing traditional Web functionality, but rather than attempt a time-consuming and often unsuccessful traditional Web search for the desired information (e.g., by attempting to identify relevant Websites, such as for an online store or for the manufacturer, either via an appropriate search query given to a search engine and or via attempts to guess the URL for an appropriate Website), the user may still prefer the speed and convenience of using the DSIP system.

Figure 3B:
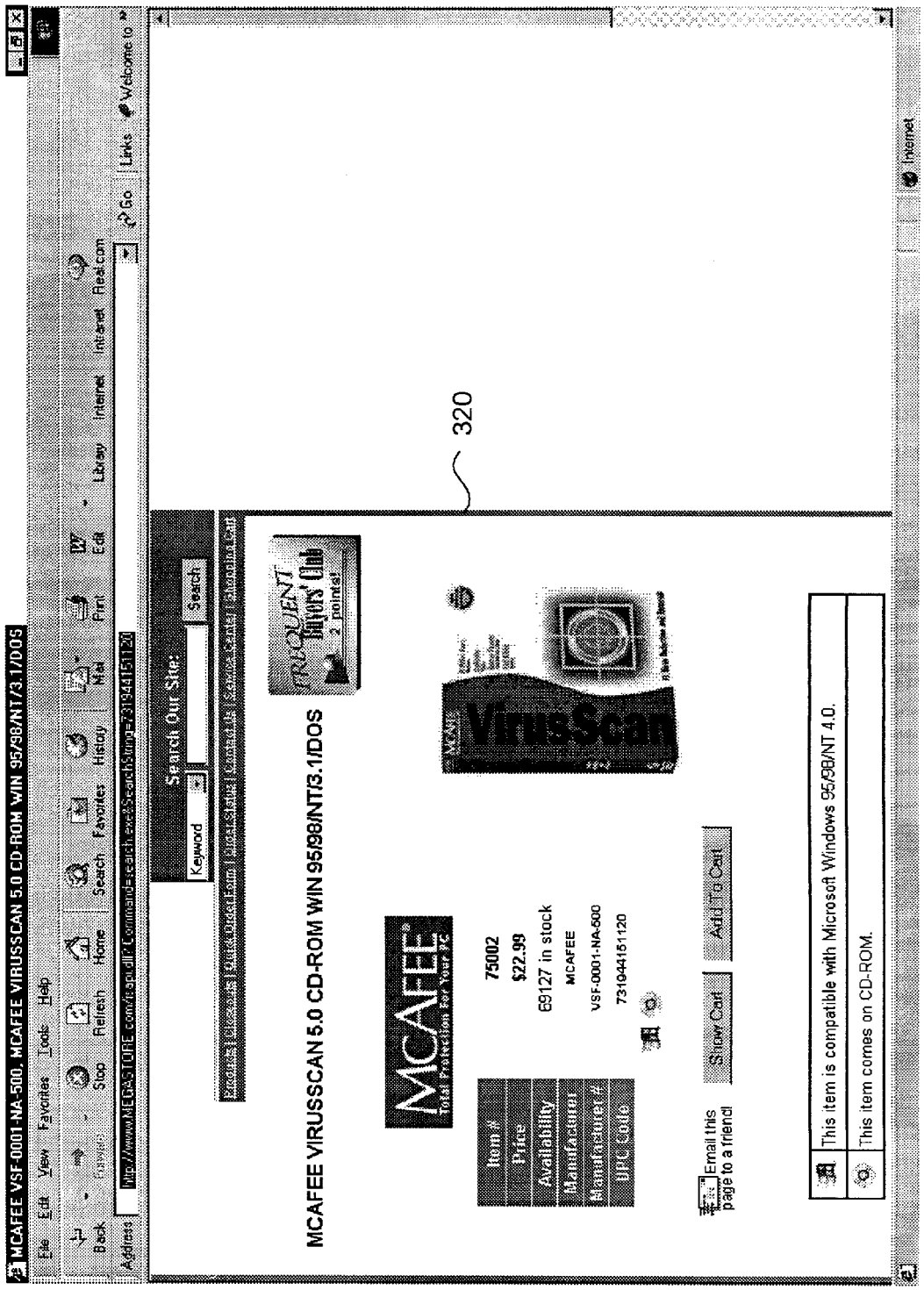

In response to the Identifier URL request, the browser could receive a variety of types of responses from the DSIP system. In the illustrated embodiment, the DSIP system determines in a manner described below that the domain name "731944151120.cc" includes an identifier of a defined type corresponding to UPC numbers, and determines a type of response to provide based on the fact that a UPC number was specified as well as on the specific UPC number. In particular, the DSIP system in the illustrated embodiment determines to provide a Web page from which the item corresponding to the UPC number can be acquired, identifies a Website that includes such a Web page (e.g., from an online store that is predefined as being a preferred provider), and provides the Web page to the client computer system. For example, the DSIP system could return the Web page 320 illustrated in FIG. 3B for display by the browser. When that Web page is displayed by the browser, the user could use the Web page to order the item.

The DSIP system can identify the defined type of the identifier included in the domain name and can determine what type of response to provide in a variety of ways. In particular, when the browser receives the Identifier URL request from the user, the browser notifies the client computer to resolve the "731944151120.cc" domain name. The client will determine an authoritative name server for the ".cc" domain from one of the root name servers (unless such information is cached from a previous request), and then request that name server to provide an IP address that is mapped to the domain name. In the illustrated embodiment, the DSIP system is configured to handle a request for any UPC number, but does not have explicitly registered individual DNS entries for each of the billions of possible UPC numbers. Instead, in this illustrated embodiment a domain name group corresponding to the defined type of UPC number identifiers has been specified and associated with the authoritative name servers for the ".cc" domain.

For example, as is illustrated in FIG. 3C, an illustrative DNS Domain Name Group Mapping database data structure 330 was defined prior to receiving the requested URL, and the ".cc" domain name servers compared the requested Identifier URL to domain name group entries in the database to determine if any match. Each of the entries 342-354 in the database corresponds to a specified domain name group of a defined type, and can have a variety of types of associated information. For example, entry 342 in the database specifies a domain name group whose members are second-level domain names in the ".cc" domain that include UPC Version A codes. As is indicated in the "Text Description" field 334 for entry 342, all such UPC codes are 12 digits long with no separators (e.g., dashes, spaces, parentheses, etc.), and any digit can occur at any position. Each domain name group has a unique "Group ID" that is specified in field 336, and field 338 contains the IP address that is mapped to domain names that are members of the domain name group, with that IP address corresponding to a server computer that is able to identify and process URL requests that include domain names have second-level domain name portions that are UPC numbers. Note that multiple domain name groups may be mapped to a single IP address.

In addition to the other fields, each entry in the database also includes an expression in the "Domain Name Group Specification Expression" field 332 that specifies the multiple members of the domain name group for that entry. Those skilled in the art will appreciate that a group of multiple members can be specified in a variety of ways. Entry 342 provides an example of specifying a group by indicating a range of values (in this example, the characters "--- " indicate a range). Thus, when an authoritative name server for the ".cc" TLD attempts to determine an IP address that corresponds to the requested "731944151120.cc" domain name, the expression in field 232 of entry 452 will match the domain name because the lower-level domain name portions of the domain name are within the defined range (in this example, since the database is being used by the authoritative name servers for the ".cc" TLD, the expressions are matched only against the lower-level portions of the domain name without the ".cc" TLD). Those skilled in the art will appreciate that if a type of identifier other than UPC Version A codes also has 12 digits without any separators, a domain name consisting of such an identifier may also match this specification for UPC Version A codes (but not necessarily all specifications for UPC Version A codes).

Those skilled in the art will appreciate that various embodiments can specify domain name groups that have varying levels of inclusiveness for a specific defined type of identifier. For example, with respect to valid UPC Version A codes, the twelfth digit is a check digit whose value depends on the initial eleven digits—thus, for any initial eleven digits, only a single twelfth digit can complete a valid UVC Version A code. However, since the domain name group specified in entry 342 does not verify whether the check digit is correct, this domain group includes both valid and invalid UPC Version A codes. In alternate embodiments, a domain name group could be specified to include only valid UPC Version A codes.

The expressions in field 332 for the other entries 344-354 provide other examples of types of identifiers and of domain name group specifications. Entry 344 corresponds to a specification for Social Security Numbers, and includes three ranges of numbers separated by dashes ("-"). Entries 346 and 348 each have expressions that match U.S. telephone numbers expressed using the North American Numbering Plan ("NANP"), with the expressions specifying the domain name groups using regular expressions. For example, entry 348 specifies a domain name group that includes any long-distance U.S. telephone number, while entry 346 specifies a domain name group that includes only certain toll-free numbers. Thus, the domain name group specified in entry 346 is a subset of the one specified in entry 348, and if a domain name request for the "1-800-555-1212.cc" domain name was received, then entries 346 and 348 would both match the domain name.

While entries 346 and 348 are both mapped to the same IP address in the example embodiment (and thus it is irrelevant which entry is used to process the request for the example "1-800-555-1212.cc" domain name), those skilled in the art will appreciate that various techniques can be used to select one entry if multiple entries match a requested domain name. For example, a priority among entries could be used to select one entry, such as based on more-specialized domain name groups having higher priorities than general groups (thus giving entry 346 a higher priority than entry 348), on entries earlier in the database having higher priorities than later entries (again giving entry 346 a higher priority than entry 348), or on explicit priorities that are assigned to entries (e.g., in an additional field in the database). Alternately, priorities could be based on user-specified or client-specified information (e.g., preference information) for the requesting user and client, or on previous selections from the client or user.

Entry 350 includes an expression specifying a group of domain names related to the 911 emergency service, with the semicolon character used in this example to separate alternate definitions. The first definition matches the domain name "911-emergency.cc", and a service associated with receiving a Identifier URL request for such a domain name could be to alert a 911 service that is nearby the location of the client (if this information is available). The second definition matches any third-level domain names whose second-level domain portion is "911", such as "fire.911.cc", "<user location>.911.cc" where "<user location>" is some type of location specifier, and "abcdefg.911.cc". The matching for the second definition is based on the use of a wildcard expression (e.g., "*") that in this example embodiment can match a variable number of alphanumeric characters. A service associated with a received Identifier URL request for a domain name matching the second definition could be specialized based on the information matching the wildcard, such as contacting a local Fire Department for the "fire.911.cc" domain name or using the location in the "<location>.911.cc" domain name. Those skilled in the art will appreciate that in other embodiments different or multiple wildcards can be used, and that wildcards can be defined to match various numbers or types of characters.

Entries 352 and 354 also specify groups with variable numbers of alphabetic or alphanumeric characters. In particular, the expression for entry 352 uses a regular expression to specify a domain name group that includes domain names having a person's last name (of at least one character) followed by a period and the person's first name (of at least one character), and can optionally be followed by another period and a single middle initial. The first and last names allows interior dashes (e.g., "Smith-Jones"), and the first name allows spaces (e.g., "Billy Bob"). As periods are used to connect the different logical portions of the identifier in this example (as opposed to dashes for telephone numbers or SSNs), a domain name such as "Smith-Jones.Tammy.X.cc" will be treated as a fourth-level domain name by the DNS system, but can still be resolved by an authoritative name server for the ".cc" TLD using entry 352. Those skilled in the art will appreciate that types of identifiers other than peoples' names may also match this specification expression, and that this specification will not match every person's name (e.g., someone with a space in their last name).

Entry 354 uses a wildcard expression format to specify a domain name group that includes three dashes and any number of initial, terminating, and intermediary alphanumeric characters. One type of identifier that will match this specification is an International Standard Book Number ("ISBN") code, which consists of 10 characters in four groups separated by dashes. As the ISBN format allows the number of numeric digits in each of the first three character groups to vary, the use of a wildcard that can match a variable number of alphanumeric characters can accommodate such variations. In addition, some ISBN codes may include an initial "ISBN", and some end with an "X" in place of the tenth digit. In the illustrated embodiment, the wildcard will match both numbers and characters, and thus would match both "0-439-13959-7" and "ISBN0-439-13959-X". As noted, other types of identifiers (e.g., some credit card numbers) will also match this expression, and thus a higher priority specification expression could be used in the database to match such identifiers instead of entry 354 if so desired.

Those skilled in the art will appreciate that various embodiments can specify domain name groups using different formats, some of which are described above, such as with ranges, regular expressions, wildcards, etc. In addition, the DSIP system can use such domain name groups in a variety of ways, such as attempting to match a specified domain name against one of the groups only if an explicit DNS entry for a registered domain name is not available, or instead checking the domain name groups before checking explicit entries. In some embodiments, rather than storing the domain name group entries in a separate database, entries are instead added for each domain name group to an appropriate zone file, such as by using "A" name-to-address resource records or a new type of resource record corresponding to groups of names. In addition, overlaps between domain name groups and registered domain names that are group members may be prevented in some embodiments, such as by preventing registrations of domain names that are members of existing domain name groups or preventing the specification of new domain name groups if any members of the group have already been registered.

Conversely, as indicated above, in some embodiments the domain name groups are not associated with a DNS name server or with the DNS system. Thus, in such embodiments the domain name servers would not check a domain name specified in a mapping request against the Domain Name Group Mapping database. Instead, such name servers may return a single IP address for all unregistered domain names that corresponds to a server computer, and the server computer could then receive requests for URLs that include such unregistered domain names and determine an appropriate manner to respond. For example, in some embodiments the server computer could use a version of the Domain Name Group Mapping database in which the IP addresses are replaced with a type of URL request response for URLs that include domain names that are group members, or could instead use an Identifier URL Response database (discussed in greater detail with respect to FIG. 3F).

FIG. 3H illustrates one mechanism by which the DNS name servers could map unregistered domain names to an IP address for an appropriate server computer. In particular, an example of a possible db.CC zone data file for a ".CC" zone is illustrated that includes DNS resource records for domain names registered within the ".cc" TLD. Each of the resource records in the group 390 corresponds to a registered domain name and has an associated mapped IP address. The last DNS resource record 395 in the file contains a wildcard expression "*" that matches any domain name that did not match an earlier entry in the file. Thus, this entry will match any domain names that are not currently registered in the ".cc" TLD. In the illustrated embodiment, the IP address associated with the wildcard entry corresponds to an DSIP server that can receive requests for URLs that include domain names that are members of a domain name group and can determine how to respond in an appropriate manner. Those skilled in the art will appreciate that in other embodiments different or no wildcards could be used, and that wildcards could be defined to match only some unregistered domain names. Similarly, multiple such wildcard entries that each match various subsets of domain names could be defined (e.g., based on regular expressions) and used.

Those skilled in the art will also appreciate that expressions can be defined to match virtually any defined type of identifier, including identifiers for items such as products (e.g., ISBN codes for books or UPC codes for a variety of types of items) or services (e.g., a 911 emergency specification so that a server can provide appropriate emergency response services) or other things (e.g., license plate numbers), identifiers for people (e.g., SSNs or name specifications), identifiers for locations (e.g., GPS coordinates or a street address), etc. In addition, such identifiers could be non-unique (e.g., "Smith.Bob.cc" is likely to correspond to multiple individuals) or unique (e.g., UPC codes, SSNS, etc.).

In addition, those skilled in the art will appreciate that in some embodiments some of the illustrated types of information that are included in the database may not be stored (e.g., a Group ID) or may be stored in other associated data structures. Conversely, in other embodiments additional information may be included in this data structure or in other associated data structures, such as fields to store entry priority information.

Thus, in this illustrative embodiment, an authoritative name server for the ".cc" TLD will determine that the "731944151120.cc" domain name matches entry 342, and will return the corresponding IP address 225.71.83.242 to the requesting client. The client will then send an HTTP Request to the server at that IP address in order to obtain the resource corresponding to the "731944151120.cc" URL.

As noted above, a server can provide a variety of types of information or services to a client, and can use various information in the header fields of an HTTP Request message to determine the type of services and/or information to provide. The header fields that are provided in an HTTP Request can vary with the version of HTTP that is being supported (e.g., HTTP 1.0 or HTTP 1.1), with the brand of Web browser used by the client (e.g., Netscape's Navigator or Microsoft's Internet Explorer), with the version of the Web browser, with the localization of the Web browser, with the device on which the Web browser operates, etc. FIG. 3D provides an illustrative example of HTTP header fields that may be supplied by a Microsoft Internet Explorer 5.0 Web browser when sending an HTTP Request message for the "731944151120.cc" URL, and FIG. 3E provides an illustrative example of HTTP header fields that may be supplied by Netscape Communicator 4.5 Web browser when sending an HTTP Request message for the same URL from the same client.

When the server computer corresponding to the 225.71.83.242 IP address receives an HTTP Request message such as one of those illustrated in FIGS. 3D and 3E, the DSIP system can use various information included in the header fields of the message to determine whether to identify or to generate an appropriate Web page, and to then provide that Web page to the client computer. As indicated previously with respect to FIG. 3B, in this example embodiment the DSIP system identifies a Web page from which the item identified in the UPC code can be acquired, and provides that Web page to the client. In an example embodiment illustrated with respect to FIG. 3F, the DSIP system performs this response as described below.

In particular, in FIG. 3F the example embodiment uses the value of the "HTTP_HOST" (or "HOST") header field of the HTTP Request message to determine the identifier included in the Identifier URL, and then determines an appropriate response to the request based on the defined type. The value of the "HTTP_HOST" header field is useful because it is the alphanumeric domain name that was specified as part of the URL request, and thus includes the specified identifier for an Identifier URL. In the example, an Example Identifier URL Response database 360 is illustrated, with each of the entries 372-378 in the database corresponding to a group of Identifier URLs (e.g., a group corresponding to a defined type of identifier). Each entry contains a value in column 362 that corresponds to identifiers that are lower-level domain name portions of values (minus the TLD) of the "HTTP_HOST" header field of an HTTP Request message. If the value in column 362 for an entry matches the lower-level portions of the domain name value of the "HTTP_HOST" header field for an Identifier URL request, the server computer can then respond to the request in the manner indicated in column 366 for the entry. As with the Domain Name Group Mapping database, expressions can identify groups of identifiers (or domain names) in a variety of ways.

Thus, for example, when the "731944151120.cc" Identifier URL request is received, entry 372 matches the domain name value without the ".cc" (i.e., the UPC number). In response, the server computer will reply with an HTTP Response message as specified in column 366 with the example "Reply:" instruction. In the illustrated embodiment, entries enclosed in "<" and ">" are dynamically replaced with the appropriate value at run-time. Thus, the "<current-date>" portion of the response will be replaced with information such as "Mon, Dec. 13, 1999 18:23:07 GMT", and the "<header-value>" portion will be replaced with the "HTTP_HOST" header field value that matched the expression in column 362. Thus, an HTTP Response message as shown in Table 1 will be sent to the client:

TABLE 1

HTTP/1.1 303 See Other
Date: Mon, 13 Dec 1999 18:23:07 GMT
Server: Apache/1.3a1
Gateway-Interface: CGI/1.1
Location:
    http://www.MEGASTORE.com/isapi.dll?Command=
    search.exe&SearchString=731944151120

In this example embodiment, the server responds to all Identifier URLs containing UPC numbers in the same manner by causing an identified Web page to be displayed to the user on the client from which the item corresponding to the UPC number can be acquired. The server in this example uses a hypothetical third-party online store named "MEGASTORE" that sells most or all items having valid UPC numbers to actually provide the Web page to the client. In particular, the server computer system can identify the particular Web page of interest without performing a search because the server knows a particular URL format for MEGASTORE's Website in which the path portion of the URL will cause the Web page for the item corresponding to a specified UPC number to be retrieved, and the server constructs and includes such a URL as the value of a "Location" header field in the HTTP Response message sent to the client. The "Location" header field instructs the Web browser on the client to retrieve and display the specified URL rather than the original URL, and thus the Web browser on the client will request the URL specified in the header field, receive the Web page for the item corresponding to the UPC number from a server computer for MEGASTORE, and display the received Web page to the user.

Those skilled in the art will appreciate that the DSIP system and the server computer can respond to a request for an Identifier URL in a variety of ways. For example, entry 374 illustrates a response to Identifier URLs consisting of ISBN numbers in which a program is executed and is provided the "HTTP_HOST" header field value as an argument. In the example embodiment, this program will perform a search to identify multiple online stores from which the specified book can be acquired, generate a Web page summarizing various information about each Website (e.g., the Website name, book price, and current book availability), and then construct and send an HTTP Response message that includes the generated Web page to the client. Those skilled in the art will appreciate that a program can be employed to provide any type of desired response, including providing information or performing services, and that a single program can perform multiple tasks (e.g., both provide information and perform a service, or perform multiple services). In addition, those skilled in the art will appreciate that responses other than "Reply" and "Execute" program instructions could be used, and that multiple such "Reply" and "Execute" instructions could be specified for a particular entry. In some embodiments, each program for an entry can be executed (either or parallel or in a specified order), while in other embodiments multiple instructions can be treated as available alternatives from which one or more will be selected.

While an Identifier URL Response database was illustrated in FIG. 3F as an example mechanism for the DSIP system and a server computer to respond to Identifier URL requests having different types of identifiers of various defined types and different types of responses, those skilled in the art will appreciate that a server can determine how to respond to Identifier URL requests in a variety of other ways. For example, in some embodiments a server computer may receive Identifier URL requests for only a single defined type of identifier (e.g., the server computer with the 225.71.83.242 IP address receives only requests identifying UPC codes), and thus would not need a database of multiple entries. Alternately, a server computer may provide the same response to any Identifier URL regardless of the defined type of the identifier (e.g., execute a response program and provide all of the HTTP Request header field information to the program), and again would not need a database of multiple entries. In other embodiments, such as when the domain name groups are not associated with the name servers, the server computer could instead use a version of the Domain Name Group Mapping database as described above.

Moreover, information other than a single "HTTP_HOST" header field can be used in determining a response (whether by an expression such as those in column 366 of the database or by a program to be executed), such as the values of other HTTP Request message header fields. For example, the DSIP system can determine what languages are appropriate for the content and transmission of the response Web page by using information in header fields such as "HTTP_ACCEPT_LANGUAGE" (or "ACCEPT-LANGUAGE") and "HTTP_USER_AGENT" (or "USER-AGENT"), and use this information to either select an appropriate Web page (e.g., one that is provided by a third party in an appropriate language) or to provide appropriate functionality (e.g., translate an identified Web page from the language in which it is provided to an appropriate language). The DSIP system can also obtain information about the device type of the client device and its display capabilities by using information in a variety of header fields (e.g., "HTTP_X_UP_SUBNO", "HTTP_UP_SUBNO" and "HTTP_SUBNO" for some wireless devices), and use this information in a variety of ways, such as to identify a Web page designed for the available display capabilities, or to modify an identified Web page to accommodate the available display capabilities (e.g., by changing an HTML Web page into a WML page to accommodate a wireless device, or by removing less important information to accommodate a smaller display area). Other information could similarly be used in a variety of other ways.

Thus, as noted, the DSIP system can use a variety of types of information that are included in the URL request when determining appropriate services or information to be provided to the client. In addition, the DSIP system can also use user-specific or client-specific information when making this determination. For example, the user or client making the request may previously have expressed preference information about the type of service desired for requested URLs that include domain names having unique identifiers of different types, and if so the DSIP system could use such information. The DSIP system could retrieve such previously specified information by storing the information itself, or by storing the information in a cookie that is located on the client device and is supplied along with the HTTP message. The DSIP system could also store information about past actions by the user or client to implicitly attempt to determine preference information.

Conversely, the DSIP system could explicitly determine information by interactively querying the user of the client as to the type of desired response. For example, in response to the request for the "731944151120.cc" URL, the DSIP system could generate and return a Web page 380 such as is illustrated in FIG. 3G. After the user selects the "Submit" button on the Web page, the DSIP system can then provide the requested service and information, and store the user selection on the client or server if that option was selected. In addition to user-specific and client-specific information, various types of stored information could also be retrieved and used in determining an appropriate response if needed.

Thus, FIG. 3A-3H provide an illustrative example of a use of the DSIP system. As indicated above, however, groups of related domain names can be specified that include any type of identifiers. These can include, for example, phone numbers, email addresses, Social Security numbers, driver's license numbers, passport numbers, GPS coordinates, latitude and/or longitude, street addresses, wireless device identifiers, credit card numbers, third-party member numbers (e.g., an insurance policy number, a club identifier, or an account number), tracking identifiers for a third-party service (e.g., shipment tracking numbers for Federal Express or the United States Postal Service), entries of a defined classification system (e.g., ICD-9 codes for medical diagnoses), catalog or parts numbers, device serial numbers, manufacturers' warranty IDs or serial numbers, customer service identifiers, UPC numbers, ISBN codes, SKU numbers, etc. Those skilled in the art will appreciate that other identifiers can similarly be specified.

Those skilled in the art will also appreciate that the DSIP system can provide a variety of types of functionality when providing information, such as locating the most appropriate Web pages based on various specified criteria, generating a Web page that lists and ranks multiple Web pages that may be appropriate, interactively querying the user for additional information or for preferences, translating a document into a particular language, formatting a document for use on a particular type of device or with particular display capabilities, etc.

In addition to the functionalities provided, the DSIP system can also provide a variety of types of services for a user or client, such as purchasing an item for the user with previously shipped payment and shipping information, providing information or messaging services to wireless devices, retrieving the tracking status for a package being shipped or for some other service provided by a third-party company, transferring money between accounts, buying or selling stocks, etc.

In addition, those skilled in the art will appreciate that the DSIP system can specialize the functionalities and services provided in a variety of ways. For example, the services and functionalities provided can be specialized based on defined types of identifiers or on specific identifiers within a type. In addition, specialization can be based on a particular user or a particular client, such as by tailoring a provided Web page for a type of client device or for the available display capabilities, for a type of communications link (e.g., presenting less information for a slow communications medium such as a cellular phone or modem), for a type of communications protocol being used (e.g., TCP/IP or WAP), for a type of document format being used (e.g., HTML or WML), for the user (e.g., by translating the language of the Web page or by translating a text document into an audio WAV file for audio presentation to a blind user), etc.

Those skilled in the art will also appreciate that the DSIP system can interact with third-parties in a variety of ways to perform or supplement the services provided. For example, the DSIP system may establish arrangements with third parties that allow the system to retrieve and present information not available to the general public (e.g., tracking information for a shipment from a particular shipping company), or may receive compensation from a third party company (either a lump-sum or per-transaction) in exchange for treating the company as a preferred provider. Payment information can also be exchanged in a variety of other situations, such as by charging a user for information provided or a service performed, or by charging a third-party company for specifying a domain name group or a group of identifiers, for operating a server associated with a domain name group, for providing requested information or services, etc. The DSIP system may also receive authorization from users to act as an agent for the user with respect to a company (e.g., a company of which the user is a member), and the system may then act for that user when performing a service (e.g., login to an online store as the user, and make a specified purchase for the user using payment information stored for the user by the company).

In the example above, the user employed the ".cc" TLD when creating a second-level domain containing the UPC numeric identifier. Those skilled in the art will appreciate that an appropriate TLD (or lower-level domain) to be used can be identified in a variety of ways. In some embodiments, a single TLD will be widely known to users for providing a variety of types of functionality and services related to a variety of types of information. In other embodiments, a search facility could be provided that would identify the appropriate TLD for a type of information desired, or a known Web page could index the appropriate TLDs. In addition, in some embodiments multiple TLDs can be used such that each TLD provides various services for a different type of identifier (e.g., the ".cc" TLD provides all of the functionality described above for UPC numbers, and another TLD provides such functionality for ISBN codes), or instead provides a single service for a variety of types of identifiers (e.g., the ".cc" TLD provides Web pages from which a specified item can be acquired for UPC, ISBN and other identifiers that identify items, and another TLD provides comparisons of specified items to related items). Similarly, lower-level domains within a single TLD could similarly be used to specify types of identifiers (e.g., "731944151120.UPC.cc" for UPC codes and "7-319-44151-1.ISBN.cc" for ISBN codes) or types of services (e.g., "731944151120.acquire.cc" to acquire the item indicated by the UPC code or "731944151120.compare.cc" to compare the item to other related items).

Figure 4:
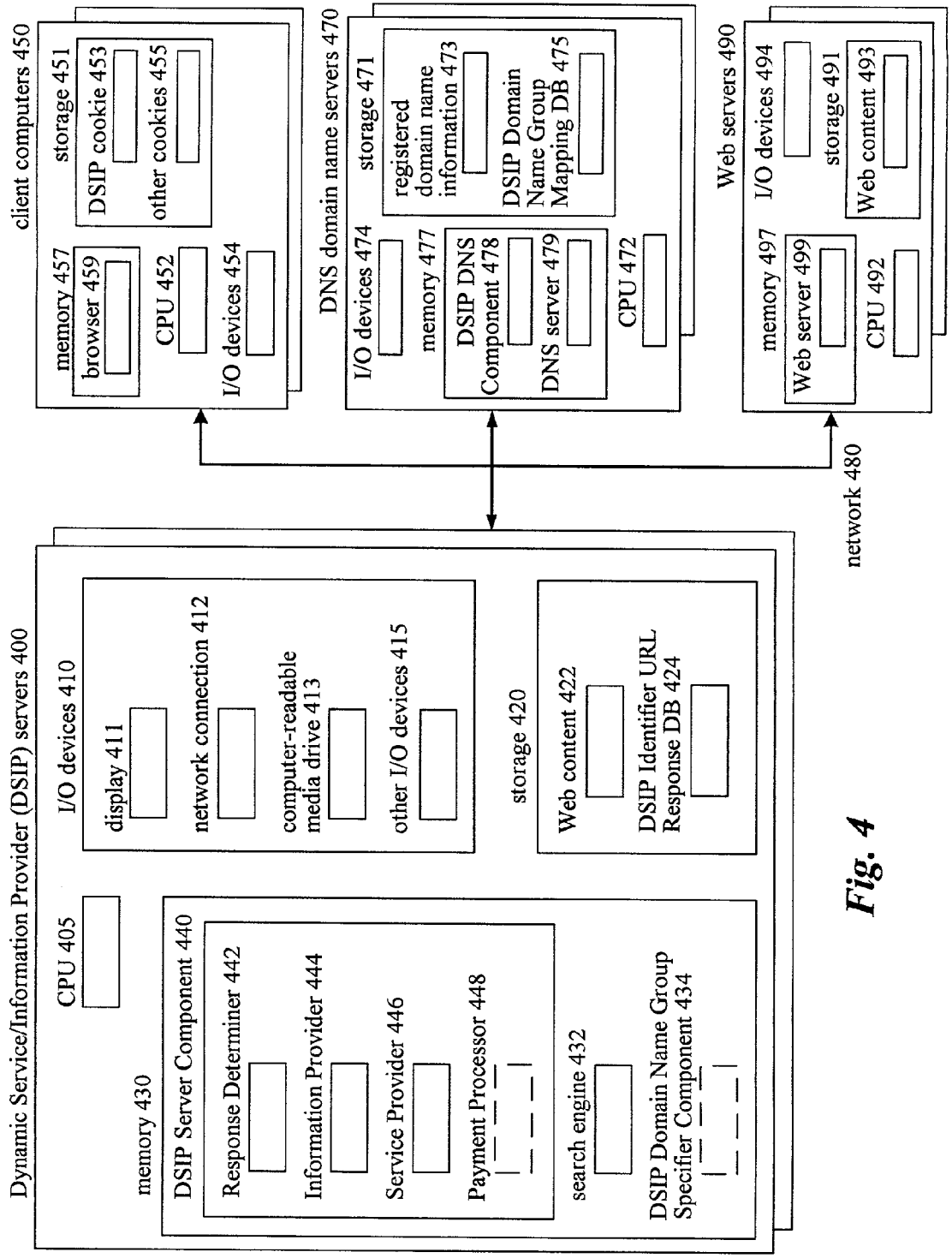
FIG. 4 is a block diagram illustrating an embodiment of the disclosed Dynamic Service/Information Provider (DSIP) system.

FIG. 4 illustrates DSIP server computers 400 suitable for executing an embodiment of the DSIP Server Component 440, DNS domain name servers 470 suitable for providing DNS domain name resolution services and for executing an embodiment of the DSIP DNS Component 478, various Web servers for providing Web contents to clients, and various client computers 450 which can access the Web servers, domain name servers, and DSIP servers.

The client computers include storage 451 (e.g., a hard drive), a CPU 452, I/O devices 454, and memory 457. A Web browser 459 is executing in the memory, and Web browser cookies are present on the storage, including a cookie 453 containing information related to the DSIP system and other cookies 455. In addition, the I/O devices include various input and output devices (not illustrated) with which a user (not illustrated) of the client can interact with the Web browser and with which the Web browser can present information to the user, such as a mouse and a display. For example, the user can interact with the Web browser to request and receive Web content (e.g., Web pages) from one or more of the Web servers 490. In particular, if the user specifies a URL that includes a domain name, the client first resolves the domain name to determine a corresponding IP address by interacting with one or more of the DNS domain name servers, and then contacts the Web server with the indicated IP address to obtain the Web content corresponding to the specified URL.

The illustrated DNS domain name server 470 includes storage 471 that stores domain name information 473 for registered domain names (e.g., zone data files with DNS resource records and a configuration file), a CPU 472, and various I/O devices 474. A memory 477 includes executing DNS server software 479 that can receive domain name resolution requests and provide corresponding IP address information from the domain name information for the registered domain names.

The illustrated Web server 490 includes various Web content 493 that is stored on storage 491, a CPU 492, and various I/O devices 494. When Web server software 499 that is executing in memory 497 receives a request to provide some of the stored Web content (e.g., from a user of a client computer), the Web server can retrieve and send the requested content to the requester.

The user of the client can also interact with the Web browser to designate URL requests with domain names that include identifiers of one or more predefined types. When the user designates such a URL, the Web browser on the client again attempts to resolve the domain name by contacting an appropriate DNS domain name server. The illustrated DNS domain name server 470 also includes a stored DSIP Domain Name Group Mapping database 475, and an executing DSIP DNS Component 478 in the memory that can receive domain name resolution requests and provide information from the DSIP Domain Name Group Mapping database. In particular, when the DSIP DNS Component receives the resolution request for the domain name specified by the user that includes an identifier of the predefined type, the component determines whether the domain name matches one of multiple domain name groups that are defined in the database. If at least one domain name group is matched, the DSIP DNS Component retrieves the IP address associated with a selected one of the matching domain name groups, and returns that IP address to the Web browser.

Each of the IP addresses associated with the domain name groups in the database correspond to one of the DSIP servers 400. Thus, after the Web browser receives the IP address for a DSIP server, the Web browser sends an HTTP Request message to that DSIP server for a URL with the domain name that includes the identifier. The illustrated DSIP server 400 includes a CPU 405, various I/O devices 410 (including a display 411, a network connection 412, a computer-readable media drive 413, and other I/O devices 415), storage 420, and memory 430. A DSIP Server Component 440 is executing in memory, and it includes a Response Determiner 442, Information Provider 444, Service Provider 446, and optionally Payment Processor 440 sub-components. The Response Determiner receives the HTTP request message from the client and retrieves various information from the HTTP header fields for the message, including the specified domain name that includes the identifier. The Response Determiner then determines how to respond to the message by determining if the identifier matches one or more groups of identifiers in the DSIP Identifier URL Response database 424 on storage 420. Each identifier group in the database can have a variety of associated information, including one or more types of responses for identifiers that are members of the group (including providing an existing identified Web page, generating and providing a new Web page, and/or performing one or more services for the user or the client). If the identifier matches at least one identifier group, the Response Determiner selects at least one response specified for one of the matching identifier groups. The Response Determiner can use a variety of available information when making this selection, including information from the URL, from header fields, from a cookie included with the URL (e.g., the DSIP cookie 453), other stored preference information, and information associated with the identifier group entry in the DSIP Identifier URL Response database.

If one of the responses is to provide information (e.g., a Web page) to the client, the Response Determiner notifies the Information Provider of the HTTP message and of the type of information to be provided. Similarly, if at least one of the responses is to perform a service for the client or the user, the Response Determiner notifies the Service Provider of the HTTP message and of each type of service to be performed. The Information Provider and Service Provider can then provide the information or perform the services as indicated. In so doing, they may also use a variety of types of information (similar to that used by the Response Determiner) to determine the specific information to provide or the particular manner in which the service is to be performed. In addition, both the Information Provider and the Service Provider may use an accessible search engine or other related functionality to assist in providing their response, such as search engine 432 executing in memory 430. In particular, when existing information is to be provided, the Information Provider may indicate to the client to retrieve Web content available from one of the Web servers 490, or instead can supply Web content such as locally stored Web content 422 on storage 420. The Information Provider and Service Provider may also notify the Payment Processor to receive or supply payments as appropriate for the actions that they take.

When the Web browser receives information to be displayed (whether directly from a DSIP server or after retrieving indicated Web content from a Web server), the browser can present the information to the user. In some situations, the presented Web content will allow interaction by the user, such as a Web page from a store for an item which can be purchased by the user from the Web page.

In some embodiments, an optional DSIP Domain Name Group Specifier Component 434 can be executing in memory of some accessible computer, such as a DSIP server, Web server, or DNS domain name server. The DSIP Domain Name Group Specifier Component can receive specifications for new domain name groups of a defined type or indications of changes to an existing group, and add the appropriate information to a DSIP Domain Name Group Mapping database on a DNS domain name server to which resolution requests for domain names in the group will be routed. Such a DSIP Domain Name Group Specifier Component could also notify the Payment Processor to obtain or provide payment for making such changes.

In a similar manner, an optional executing DSIP Identifier Group Specifier Component (not illustrated) could receive specifications for new identifier groups with members that are identifiers of a defined type or indications of changes to an existing group, and add the appropriate information to a DSIP Identifier URL Response database on a DSIP server to which requests for identifiers of the defined type will be routed. Such a DSIP Identifier Group Specifier Component could also notify the Payment Processor to obtain or provide payment for making such changes.

In some embodiments, one or more of the DSIP components may be operated by a registrar for a TLD, such as the ".cc" TLD. In particular, if such a registrar is a primary registrar for a TLD, then the registrar can control the DNS domain name server for that TLD, and thus can operate a DSIP Domain Name Group Specifier Component and DSIP DNS Component for that domain name server if so desired. In addition, the registrar can control the DSIP servers that are associated with domain name groups defined on that DNS domain name server, including the DSIP Identifier URL Response databases for those DSIP servers. Thus, the registrar can also control a DSIP Identifier Group Specifier Component and the various sub-components of a DSIP Server Component for such a DSIP server if so desired.

Those skilled in the art will appreciate that computer systems 400, 450, 470 and 490 are merely illustrative and are not intended to limit the scope of the present invention. The computer systems may be connected to other devices that are not illustrated, including through one or more networks such as the Internet or via the World Wide Web (WWW). In addition, the functionality provided by the illustrated DSIP system components may in some embodiments be combined in fewer components or distributed in additional components. Similarly, in some embodiments the functionality of some of the illustrated components may not be provided and/or other additional functionality may be available. For example, while the illustrated DSIP system includes both the DSIP Server Component and DSIP DNS component, in other embodiments only one of the components may be present, such as not including the DSIP DNS component when domain name groups are not associated with name servers.

Those skilled in the art will also appreciate that, while the various components of the DSIP system are illustrated as being stored in memory while being used, these items or portions of them can be transferred between memory and other storage devices for purposes of memory management and data integrity. Similarly, while the various stored databases and other information are illustrated as being present on storage while being used, those skilled in the art will appreciate that these items, or portions of them, can instead be present in memory and transferred between storage and memory. The DSIP components may also be stored as instructions on a computer-readable medium, such as a hard disk, a memory, a network, or a portable article to be read by an appropriate drive. Similarly, the data structures of the DSIP system may also be stored on a computer-readable medium, such as the various databases. The DSIP system instructions and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

In some embodiments, a client system communicates with a server system in order to send HTTP requests and receive Web pages from the server over the Internet. One skilled in the art will appreciate, however, that the techniques of the DSIP system can be used in various environments other than the Internet. Also, various communication channels may be used, such as a local area network, a wide area network, or a point-to-point dialup connection. In addition, a "client", "server" or "host" may comprise any combination of hardware or software that can interact, including computers, network devices, internet appliances, PDAs, wireless phones, pagers, electronic organizers, television-based systems and various other consumer products that include inter-communication capabilities. While Web pages are often constructed using HTML, other methods can be used to create such pages, such as Java, XML, HDML, WML, CGI scripts, etc. Similarly, communication protocols other than HTTP can be used, such as WAP, TCP/IP, or FTP, as well as a variety of inter-device communication mechanisms, including CDPD, CDMA, GSM, PDC, PHS, TDMA, FLEX, ReFLEX, iDEN, TETRA, DECT, DataTAC, Mobitex, etc. Both the client and the server system can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figure 5:
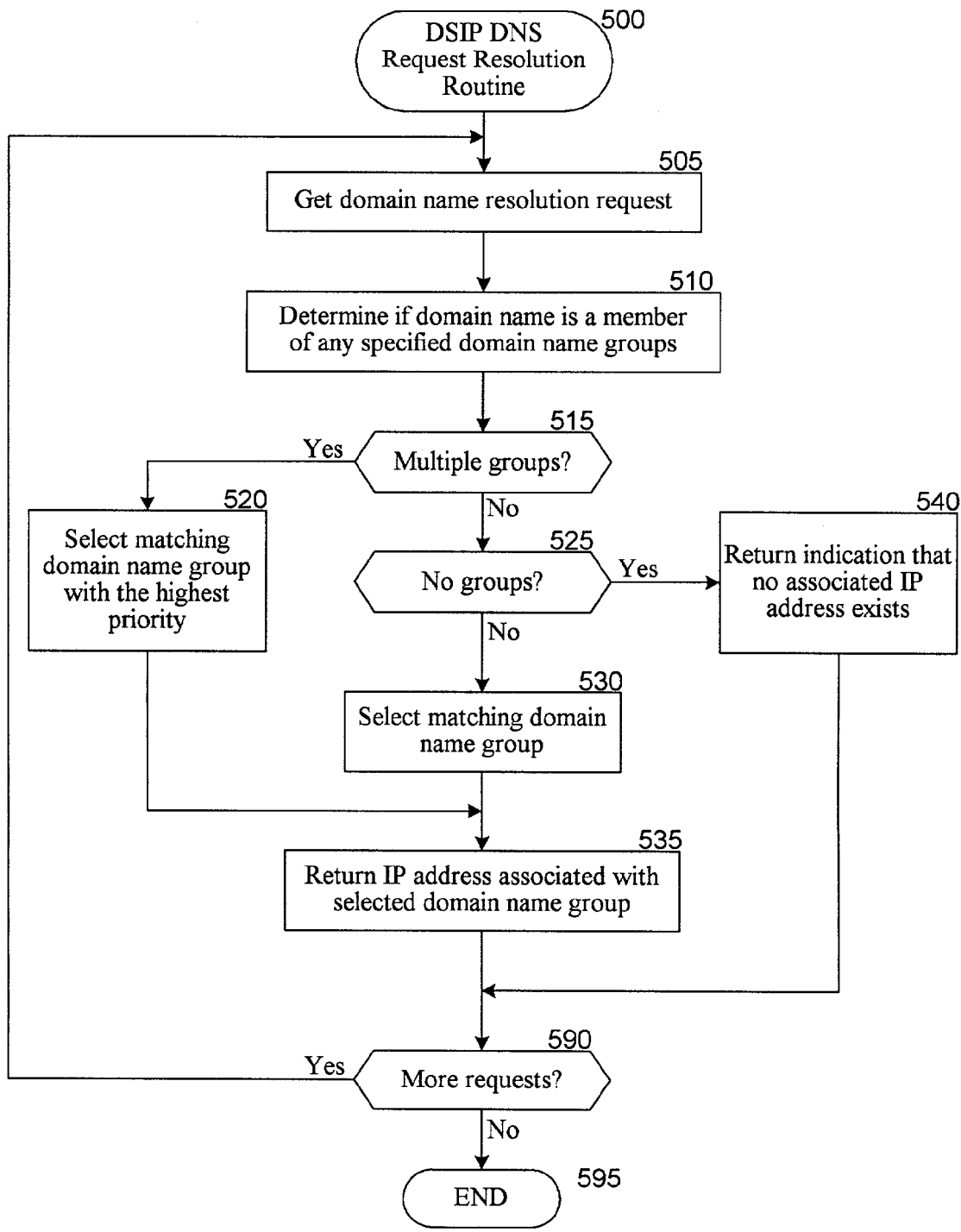
FIG. 5 is a flow diagram of an embodiment of the DSIP DNS Request Resolution routine.

FIG. 5 is a flow diagram of an embodiment of the DSIP DNS Request Resolution routine 500. The routine receives requests to resolve domain names that include identifiers, determines if any defined domain name groups include the domain name as a member, and if so returns an IP address associated with one of those domain name groups. The routine begins at step 505 where a domain name resolution request is received. The routine continues to step 510 to determine if the domain name is a member of any specified domain name groups, such as domain name groups defined in a DSIP Domain Name Group Mapping database. In step 515, the routine determines if multiple groups were identified as matching the domain name. If so, the routine continues to step 520 to select a matching domain name group with the highest priority. If multiple groups were not determined to match, the routine instead continues to step 525 to determine if no groups match the domain name. If so, the routine continues to step 540 to return an indication that the domain name cannot be resolved to an IP address. If it was instead determined in step 525 that one group matched the domain name, the routine continues to step 530 to select that domain name group. After steps 520 or 530, the routine continues to step 535 to determine and return the IP address associated with the selected domain name group. After steps 535 or 540, the routine continues to step 590 to determine if there are more requests. If so, the routine returns to step 505, and if not the routine continues to step 595 and ends.

Those skilled in the art will appreciate that the DSIP DNS Request Resolution routine can be operated in conjunction with or separately from a DNS server routine that resolves registered domain names. In addition, when multiple domain name groups match a requested domain name, a domain name group with the highest priority can be selected in a variety of ways. Similarly, the domain name groups may be specified in a variety of formats and stored in a variety of locations, and the determination of whether a requested domain name is a member of one of the domain name groups will vary depending on such factors. Conversely, if domain name groups are not associated with name servers, the DSIP DNS Request Resolution routine in that embodiment may not be used at all, or could merely return the IP address mapped to registered domain names and return the IP address for an appropriate server computer for unregistered domain names.

Figure 6:
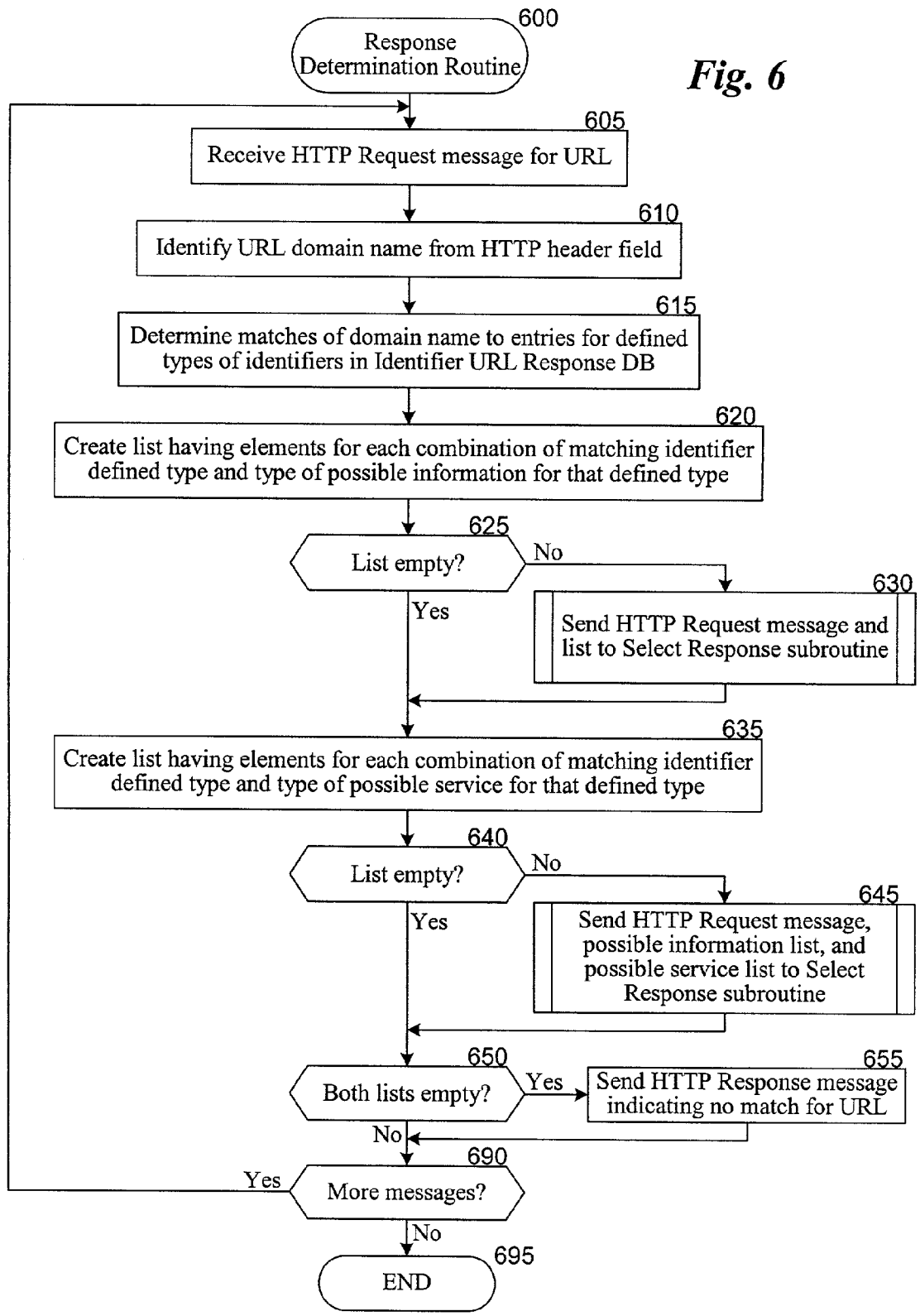
FIG. 6 is a flow diagram of an embodiment of the Response Determination routine.

FIG. 6 is a flow diagram of an embodiment of the Response Determination routine 600. The routine receives HTTP Request messages for a specified URL with a domain name that includes an identifier, determines whether the identifier matches one or more identifier groups that specify identifiers of a defined type, and determines the type of response to the message based on the defined type of the identifier, the specific value of the identifier, and/or a variety of other additional information. The routine begins in step 605 where an HTTP Request message is received. The routine continues to step 610 where the domain name for the URL is identified from an HTTP header field. In step 615, the routine then determines if the domain name includes an identifier that matches one of the specified identifier groups whose members are identifiers of a defined type, such as entries in an Identifier URL Response database. The routine then continues to step 620 to create a list having entries that represent each combination of a defined identifier type from a matched group and a type of possible information that can be supplied for that defined type. Those skilled in the art will appreciate that the types of possible information that can be supplied for an identifier of a defined type can be determined in a variety of ways, such as by being associated with the identifier group of that defined type. The routine then continues to step 625 to determine if the list of possible information types to provide is empty. If not, the routine continues to step 630 where it executes the Select Response subroutine and supplies as arguments the HTTP Request message and the list of possible information types to provide.

After step 630, or if it was determined in step 625 that the list was empty, the routine continues to step 635 to create a list having entries that represent each combination of a defined identifier type from a matched group and a type of possible service that can be performed for the defined type. Those skilled in the art will appreciate that the types of possible services that can be performed for an identifier of a defined type can be determined in a variety of ways, such as being associated with the identifier group of the defined type. The routine next continues to step 640 to determine if the list of possible services to perform is empty. If not, the routine continues to step 645 where it executes the Select Response subroutine and supplies as arguments the HTTP Request message, the list of possible services to perform, and the list of possible information types to provide. After step 645, or it was determined in step 640 that the list was empty, the routine continues to step 650 to determine if both lists are empty. If so, the routine continues to step 655 to send an HTTP Response message to the requester from whom the HTTP Request message was received that indicates that no match was available for the URL. After step 655, or if it was determined in step 650 that both lists were not empty, the routine continues to step 690 to determine if there are more messages to receive. If so, the routine returns to step 605, and if not the routine continues to step 695 and ends.

Those skilled in the art will appreciate that the DSIP Response Determination routine can be operated in conjunction with or separately from a Web server routine that handles requests for URLs whose domain names do not include identifiers of defined types, such as those that specify available existing resources. In addition, the identifier groups may be specified in a variety of formats and stored in a variety of locations. Thus, the determination of whether a domain name or an identifier within a domain name matches identifier groups will vary depending on such factors.

Figure 7:
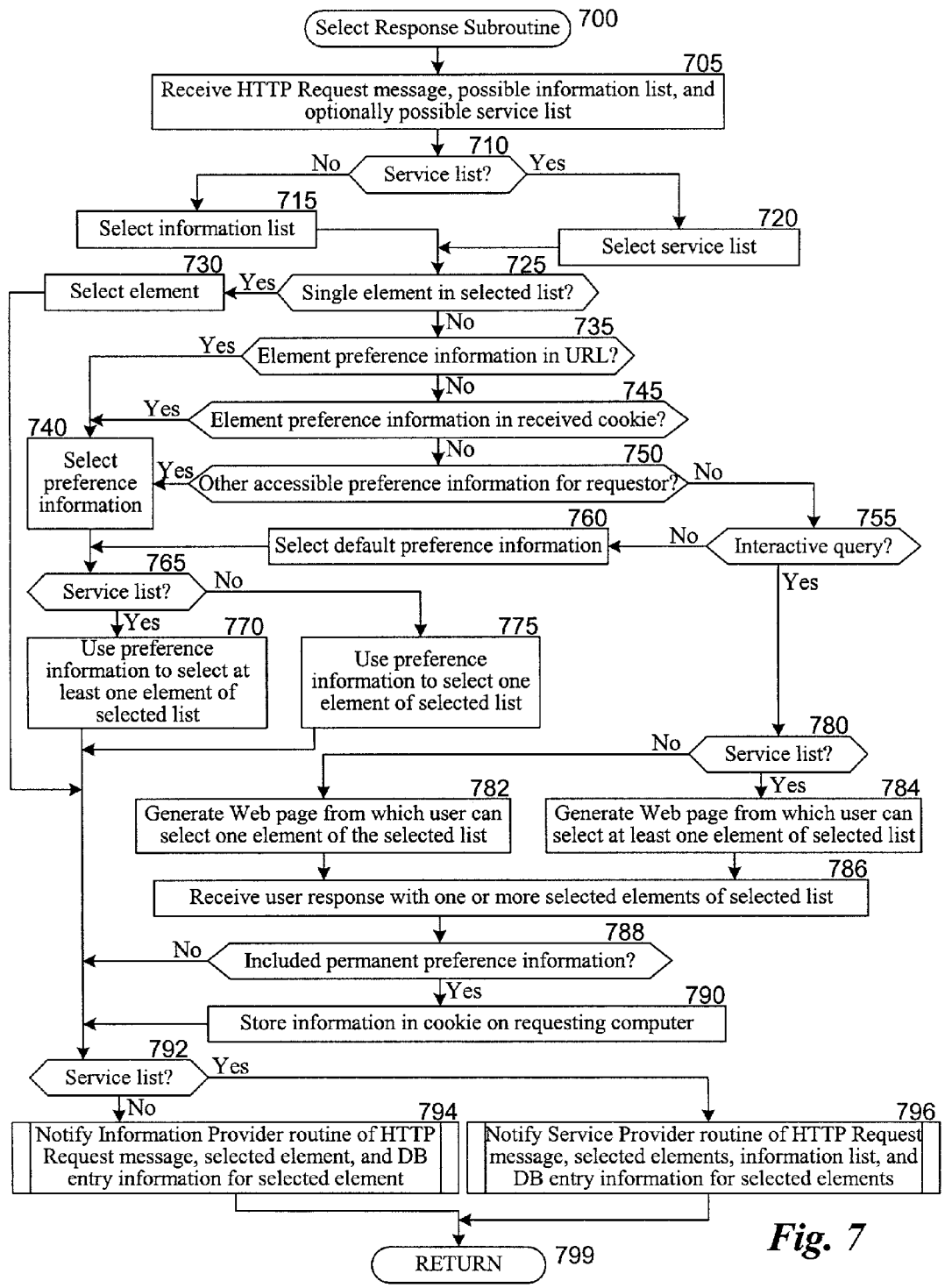
FIG. 7 is a flow diagram of an embodiment of the Select Response subroutine.

FIG. 7 is a flow diagram of an embodiment of the Select Response subroutine 700. The subroutine receives a list of possible responses of either types of information to provide or services to perform, uses various types of information to select either one type of information or at least one service, and notifies an appropriate routine to provide the selected information or to perform the selected services. The list from which the response will be selected will include at least one element, with each element identifying a possible defined type of the identifier and a possible response for that defined type.

The subroutine begins in step 705 where it receives a copy of the HTTP Request message for which the response is being formulated, the list of either possible information types to provide or possible services to perform from which the selection is to be made, and if a service is being selected, also the list of possible information types. In the illustrated embodiment, only a single response Web page will be sent to the requester, so if both information is provided and at least one service is performed, the response Web page will contain the type of information to be provided. Conversely, if it least one service is performed but no information is to be provided, a response Web page containing information about the status of the services performed will be returned to the requester. Those skilled in the art will appreciate that in other embodiments multiple responses could be sent, or a single composite response could be sent with a variety of types of information (e.g., with multiple identified existing Web pages each in a separate frames of a composite response Web page, or with one or more generated web pages or other types of information similarly included in such a page).

The subroutine next continues to step 710 to determine if a list of possible services has been supplied, thus indicating that one or more of those services are to be selected to be performed. If so, the subroutine continues to step 720 to select the list of possible services, and if not the subroutine continues to step 715 to select the list of possible information types. After steps 715 or 720, the subroutine continues to step 725 to determine if there is a single element in the selected list, and if so continues to step 730 to select that element. If there are instead multiple elements in the selected list, the subroutine attempts to identify specified preference information that will allow one or more of the elements of the selected list to be selected for the response, and can also interactively query the requester for such preference information. In particular, the subroutine continues to step 735 to determine if preference information is available as part of the URL that was specified, such as in the path portion of the URL. If not, the subroutine continues to step 745 to determine if preference information is available in a cookie for the DSIP system that was received as part of the URL Request message. If not, the subroutine continues to step 750 to determine if other accessible preference information is available for the requester, such as preference information that is maintained and stored by the DSIP system. If any of the types of preference information are determined to be available, the subroutine continues to step 740 to select that preference information. However, if none of the types of preference information are available, the subroutine continues to step 755 to determine whether to interactively query the user for preference information. If not, the subroutine continues to step 760 to select default preference information. After steps 740 or 760, the subroutine continues to step 765 to determine if the response to be selected is from the list of possible services. If so, the subroutine continues to step 770 to use the selected preference information to select at least one of the elements from the selected list of possible services, and if not the subroutine continues to step 775 to use the selected preference information to select one element from the selected list of possible information types.

If it was instead determined in step 755 to interactively query the user from whom the URL Request message was received, the subroutine continues to step 780 to determine if the response to be selected is from the list of possible services. If so, the subroutine continues to step 784 to generate a Web page from which the user can select at least one element of the selected list of possible services, and if not the subroutine continues to step 782 to generate a Web page from which the user can select one element of the selected list of possible information types. The generated Web pages can also include a user-selectable option so that the selection made by the user will be stored and used as preference information for future selections by this user. After steps 782 or 784, the subroutine continues to step 786 to receive a response from the user that indicates one or more selected elements of the selected list. The subroutine then continues to step 788 to determine if the user specified to treat the selections as permanent preference information, and if so the subroutine continues to step 790 to store the preference information in a cookie for the DSIP system to be stored on the client computer used by the user.

After steps 730, 770, 775, or 790, or if it was determined in step 788 that permanent preference information was not specified, the subroutine continues to step 792 to determine if the response to be selected is from the list of possible services. If so, the subroutine continues to step 796 to notify the Service Provider routine to perform the one or more selected services, including as arguments a copy of the HTTP Request message, the selected elements that each specify a defined type of the identifier and an associated service to perform, information from the identifier group database entries of the defined types of the selected elements, and the list of possible information types. If the response to be selected is instead from the list of possible information types, the subroutine continues to step 794 to notify the Information Provider routine to provide the indicated type of information, including as arguments a copy of the HTTP Request message, the selected element that specifies a defined type of the identifier and an associated type of information to provide, and information from the identifier group database entry of the defined type of the selected element. After steps 794 or 796, the subroutine continues to step 799 and returns.

Figure 8:
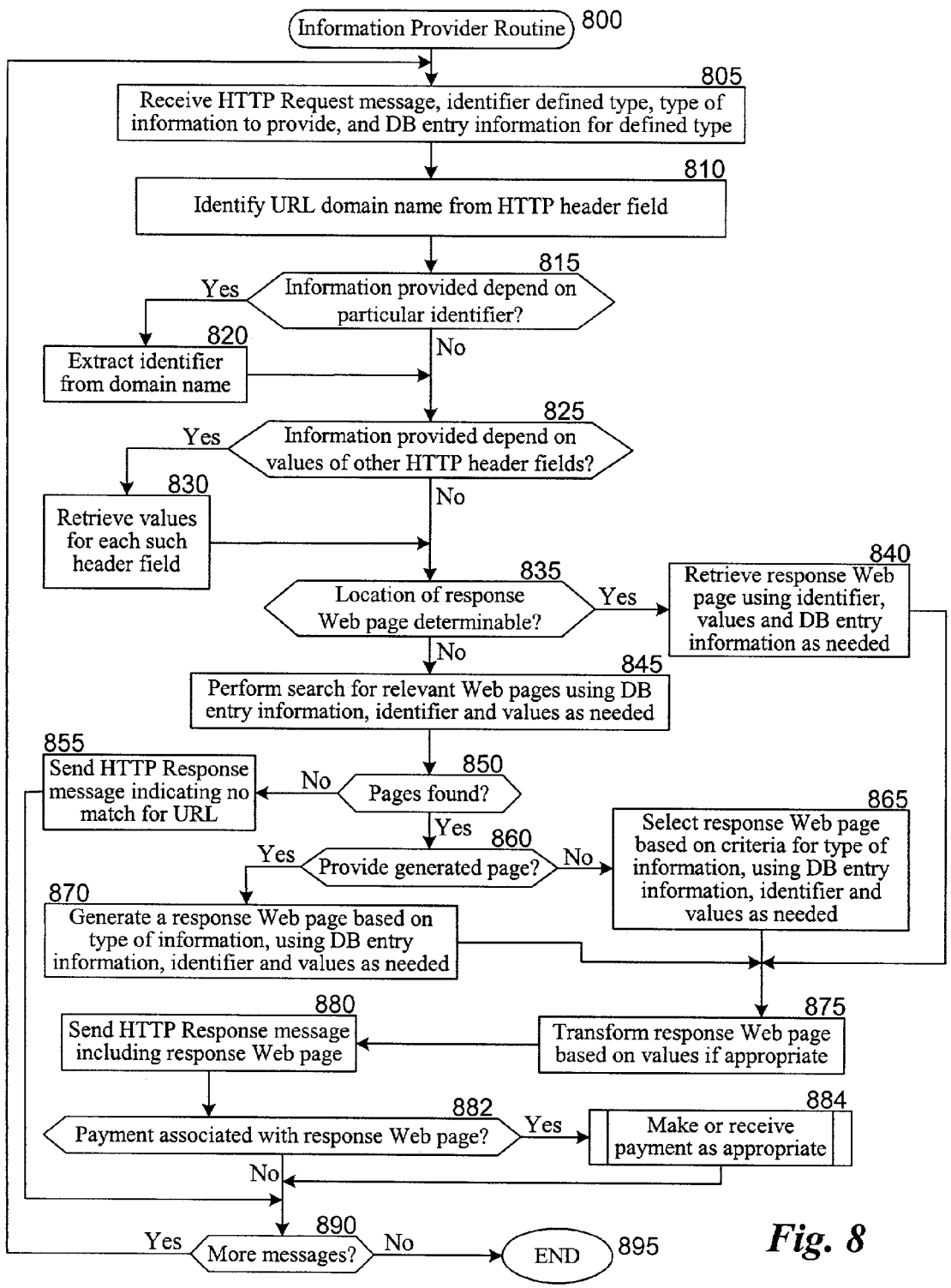
FIG. 8 is a flow diagram of an embodiment of the Information Provider routine.

FIG. 8 is a flow diagram of an embodiment of the Information Provider routine 800. The routine receives an indication of a type of information to provide for an identifier of a defined type, as well as information from the identifier group for that defined type of identifier and a copy of the received HTTP Request message for the URL with the domain name that includes the identifier, and provides appropriate information to the requester.

The routine begins in step 805 where it receives an indication of a type of information to provide for an identifier of a defined type, information from the identifier group for that defined type of identifier, and a copy of the received HTTP Request message for the URL with the domain name that includes the identifier. The routine continues to step 810 where it identifies the domain name for the URL that was requested from an HTTP header field. In step 815, the routine then determines if the information to be provided depends on the particular identifier of the defined type, or merely on the defined type itself. For example, for a domain name that includes a particular UPC number, information could be provided about the particular item to which the identifier corresponds or instead about UPC numbers in general. This determination can be made in various ways, such as based on the type of information to be provided or on other information associated with the identifier group for the defined type of the identifier. If the particular identifier is determined to be needed, the routine continues to step 820 to extract the identifier from the domain name. After step 820, or if the particular identifier was determined not to be needed, the routine continues to step 825 to determine whether the information to be provided depends on values of other HTTP header fields. For example, information from various header fields could be retrieved that indicates the transmission protocol or encoding to be used, the language for the content of the provided Web page, display characteristics of the client device or other device-specific information, etc. If information from one or more header fields is needed, the routine continues to step 830 to retrieve values for each such header field.

After step 830, or if it was determined that values of the header fields were not needed, the routine continues to step 835 to determine if the type of information to be provided includes an existing Web page, and if so, whether a URL for a response Web page can be determined without performing a search. For example, information associated with the identifier group for the defined type of the identifier may include a partial specification of such a URL from which the URL can be determined by using available information (e.g., the particular identifier or HTTP header field values). If the URL for an appropriate response Web page is determinable, the routine continues to step 840 to retrieve the response Web page using the available information as needed, and if not the routine continues to step 845 to perform a search for relevant Web pages using available information as needed. As with determining the URL for an existing Web page, the appropriate search parameters for conducting the search can be determined in a variety of ways, such as based on the type of information to be provided or by using information associated with the identifier group for the defined type of the identifier, the particular identifier, the defined type, and/or values from various HTTP header fields. After performing the search, the routine continues to step 850 to determine if any Web pages were found, and if not the routine continues to step 855 to send an HTTP Response message to the client indicating that no match for the URL was located.

If at least one Web page was found, the routine instead continues to step 860 to determine whether to provide an existing Web page or a generated Web page, using various available information as previously indicated such as the type of information to provide. If it is determined to provide an existing Web page, the routine continues to step 865 to select one of the Web pages identified in the search by using various criteria. For example, if the type of information to provide is a Web page with the lowest available price for an item indicated by the identifier, a criteria of lowest item price would be used to select the appropriate Web page. Conversely, if it was determined to provide a generated Web page, the routine continues instead to step 870 to generate an appropriate response Web page using information from one or more of the Web pages identified in the search.

After steps 840, 865, or 870, the routine continues to step 875 to transform the Web page to be provided if appropriate based on HTTP header field values, such as to translate the content of the Web page into an appropriate language. The routine then continues to step 880 to send an HTTP Response message to the requester that includes the response Web page. In step 882, the routine then determines whether there is payment that is associated with the response Web page, and if so continues to step 884 to execute the Payment Processor routine to make or receive payment as appropriate. As with the other determinations, the decision as to whether payment is appropriate can be made based on various available information, such as the type of information to be provided or information associated with the identifier's defined type, as well as with the one or more particular Web pages used for the response Web page and with the providers of those Web pages. After step 884, or if it was determined that payment was not appropriate, the routine continues to step 890 to determine if there are more messages to be processed. If so, the routine returns to step 805, and if not the routine continues to step 895 and ends.

Those skilled in the art will appreciate that if an existing Web page is to be provided to the client without modification, the routine would not have to retrieve the Web page itself and then provide it to the client. Instead, the routine could provide an HTTP Response message to the client that included a designation of the URL for that existing Web page (e.g., using the Location HTTP header field), and the client's Web browser could then retrieve the existing Web page.

Figure 9:
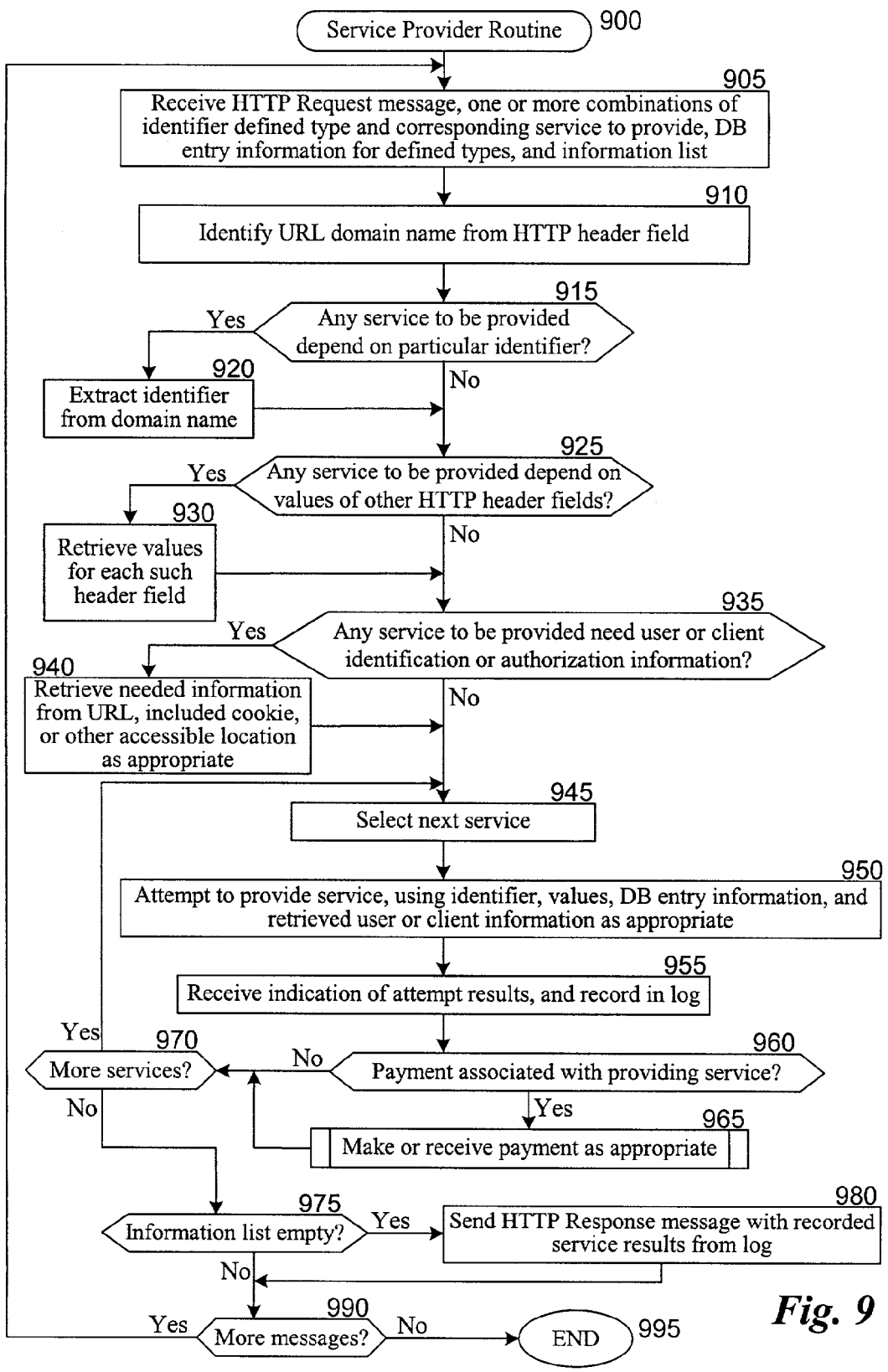
FIG. 9 is a flow diagram of an embodiment of the Service Provider routine.

FIG. 9 is a flow diagram of an embodiment of the Service Provider routine 900. The routine receives an indication of one or more types of services to perform for an identifier of one or more defined types, information from the identifier groups for those defined types of identifier, a copy of the received HTTP Request message for the URL with the domain name that includes the identifier, and a copy of the list of information types to be provided. The routine performs the indicated services, and if the requester is not to receive other information, provides a summary of the status for the services provided.

The routine begins in step 905 where it receives an indication of one or more types of services to perform for an identifier of one or more defined types, information from the identifier groups for those defined type of identifier, a copy of the received HTTP Request message for the URL with the domain name that includes the identifier, and a copy of the list of information types to be provided. The routine continues to step 910 where it identifies the domain name for the URL that was requested from an HTTP header field. In step 915, the routine then determines if the services to be performed depend on the particular identifier of the defined type, or merely on the defined type itself. For example, a domain name that includes an identifier for the 911 Emergency service may not include particular information about the type of service needed, while an identifier that specifies an account of the user would be needed to make modifications to or receive information about that account. This determination about the particular identifier can be made in various ways, such as based on the services to be performed or on other information associated with the identifier groups for the defined types of the identifier. If the particular identifier is determined to be needed, the routine continues to step 920 to extract the identifier from the domain name.

After step 920, or if the particular identifier was determined not to be needed, the routine continues to step 925 to determine whether the services to be performed depend on values of other HTTP header fields. If information from one or more header fields is needed, the routine continues to step 930 to retrieve values for each such header field. After step 930, or if it was determined that values of the header fields were not needed, the routine continues to step 935 to determine if any of the services to be provided needs identification or authorization information about the user or the client device, and if so continues to step 940 to retrieve such information from an accessible location such as the path of the URL, a DSIP system cookie included with the HTTP Request message, a storage location maintained by the DSIP system, etc.

After step 940, or if such user or client information was determined not to be needed, the routine continues to step 945 to select the next service to be performed, beginning with the first. The routine then continues to step 950 where it attempts to provide the service, using the various available information (e.g., the type of service, the defined type of the identifier, the particular identifier, HTTP header values, information associated with the identifier group of the defined type, retrieved user or client information, etc.) as needed. Those skilled in the art will appreciate that virtually any type of online operation that could be performed by a user could also be performed by the Service Provider as a service, as well as various types of automated services which a user may not be able to perform. The routine next continues to step 955 where it receives an indication of the results of the service performance attempt, and stores the information in an accessible manner (e.g., in a log). The routine then continues to step 960 where it determines whether payment is associated with performing the service, and if so continues to step 965 to execute the Payment Processor routine to make or receive payment as appropriate. As with the other determinations, the decision as to whether payment is appropriate can be made based on various available information such as the type of service performed or information associated with the identifier's defined type, as well as with any third-parties involved in providing the service. After step 965, or if it was determined that payment was not appropriate, the routine continues to step 970 to determine if there are more services to be performed, and if so the routine returns to step 945.

If there are not more services, the routine continues to step 975 to determine if the list of possible information types provided to the routine is empty. If so, then the requester will not receive a response Web page based on information to be provided, and so the routine instead continues to step 980 to generate and send an HTTP Response message to the requester that includes the results of the services performed. After step 980, or if it was determined that the information list was not empty, the routine continues to step 990 to determine if there are more messages to be processed. If so, the routine returns to step 905, and if not the routine continues to step 995 and ends.

Figure 10:
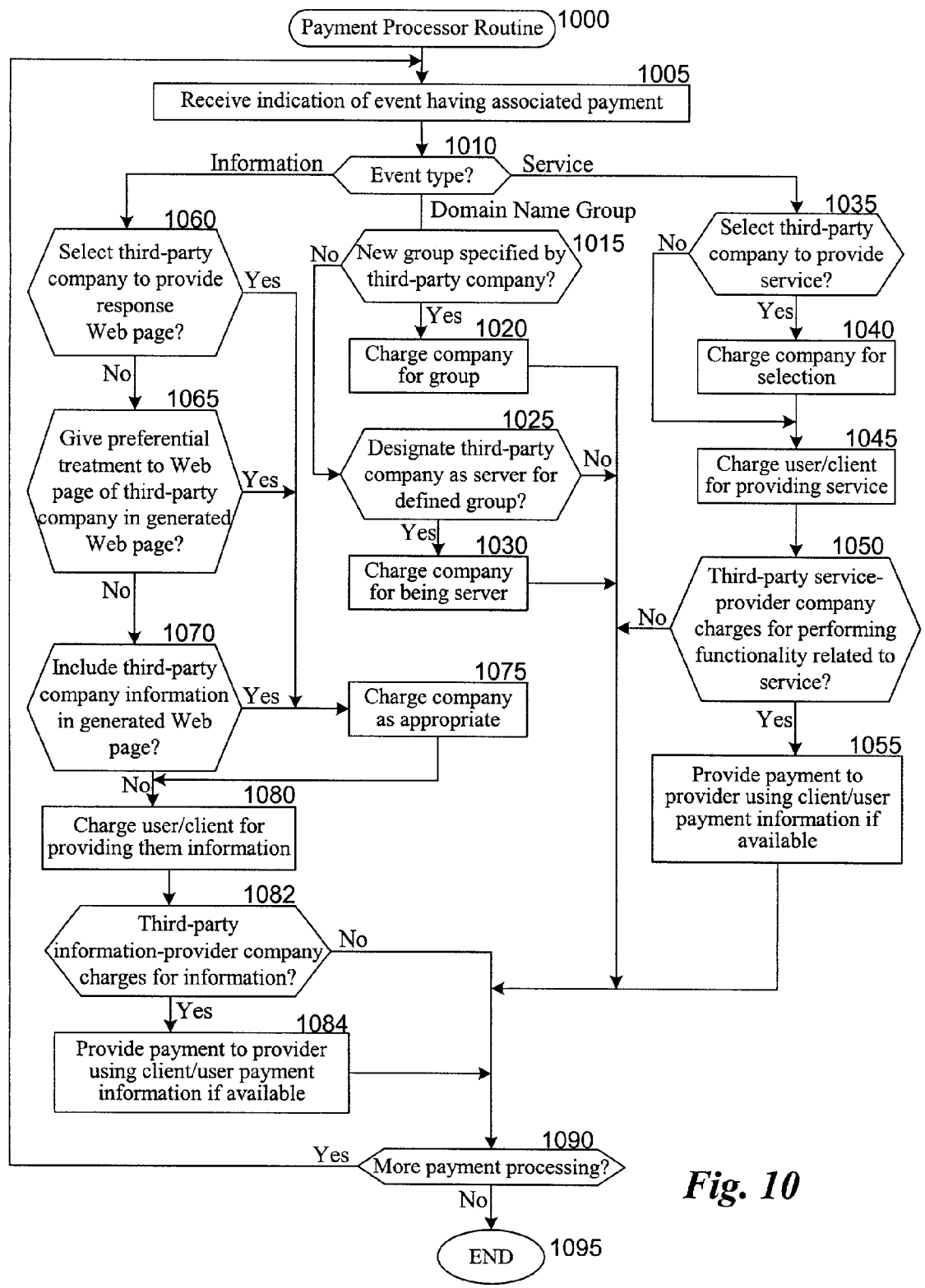
FIG. 10 is a flow diagram of an embodiment of the Payment Processor routine.

FIG. 10 is a flow diagram of an embodiment of the Payment Processor routine 1000. The routine receives an indication of an event that has an associated payment, and obtains or makes the payment as appropriate. The routine begins in step 1005 where it receives an indication of an event having an associated payment. The routine then continues to step 1010 to determine the type of event. If the event is related to a domain name group, the routine continues to step 1015 to determine if the event is that a new domain name group has been specified by a third-party company. If so, the routine continues to step 1020 where it charges the company for the group specification, such as a one-time fee or the first of periodic payments. If not, the routine instead continues to step 1025 to determine if the event is that a server of a third-party company has been designated as the DSIP server for a specified domain name group, and if so continues to step 1030 to charge the company for allowing them to provide the server. Those skilled in the art will appreciate that similar payment actions can be taken for events related to identifier groups, such as when a new identifier group of a defined type is specified by a third-party company, or when a third-party company is designated as the provider of information for the defined type or as a performer of services related to identifiers of the defined type.

If it was instead determined in step 1010 that the event type was a service being performed by the DSIP system, the routine continues to step 1035 to determine if a third-party company was selected as being allowed to provide some or all or the service or to provide related functionality, and if so the routine continues to step 1040 to charge the company for that selection. After step 1040, or if a third-party company was not so selected, the routine continues to step 1045 to optionally charge the user and/or the client for performing the service. The routine then continues to step 1050 to determine if a third-party company was involved in performing the service and if the third-party company charges for those actions. If so, the routine continues to step 1055 to provide payment to the company, preferably using payment information for the user and/or client (e.g., a credit card or pre-existing account) if available.

If it was instead determined in step 1010 that the type of event was the providing of information, the routine continues to step 1060 to determine if a third-party company was selected as being allowed to provide some or all of the contents of the response Web page. If not, the routine continues to step 1065 to determine if information from a third-party company was treated favorably in a generated Web page, such as by including it and not including information from others, or by giving such information a preferred location or rating. If not, the routine continues to step 1070 to determine if other third-party company information is included in a generated Web page, such as an advertisement or other promotional information. If the determination in any of steps 1060, 1065, or 1070 is in the affirmative, the routine continues to step 1075 to charge the company as appropriate. After step 1075, or if it was determined in step 1070 that company information was not included, the routine continues to step 1080 to optionally charge the user and/or the client for providing the information. The routine then continues to step 1082 to determine if a third-party company from whom information was retrieved charges for the information, and if so continues to step 1084 to provide payment to the company, preferably using payment information for the user and/or client. After steps 1020, 1030, 1055, or 1084, or if the determination in steps 1025, 1050, or 1082 was in the negative, the routine continues to step 1090 to determine if there are more events for which to process payments. If so, the routine returns to step 1005, and if not the routine continues to step 1095 and ends.

Those skilled in the art will appreciate that payment could be charged by the DSIP system or a third-party company for a variety of other actions or inactions that are taken by the DSIP system. In addition, amounts of payments can be determined in a variety of ways, such as by being predefined for particular types of actions or inactions, or by instead being interactively negotiated. Moreover, a user or client could indicate willingness to pay a specific amount or a maximum amount as part of the HTTP Request message, such as in one or more DSIP-specific HTTP header fields.

Figure 11:
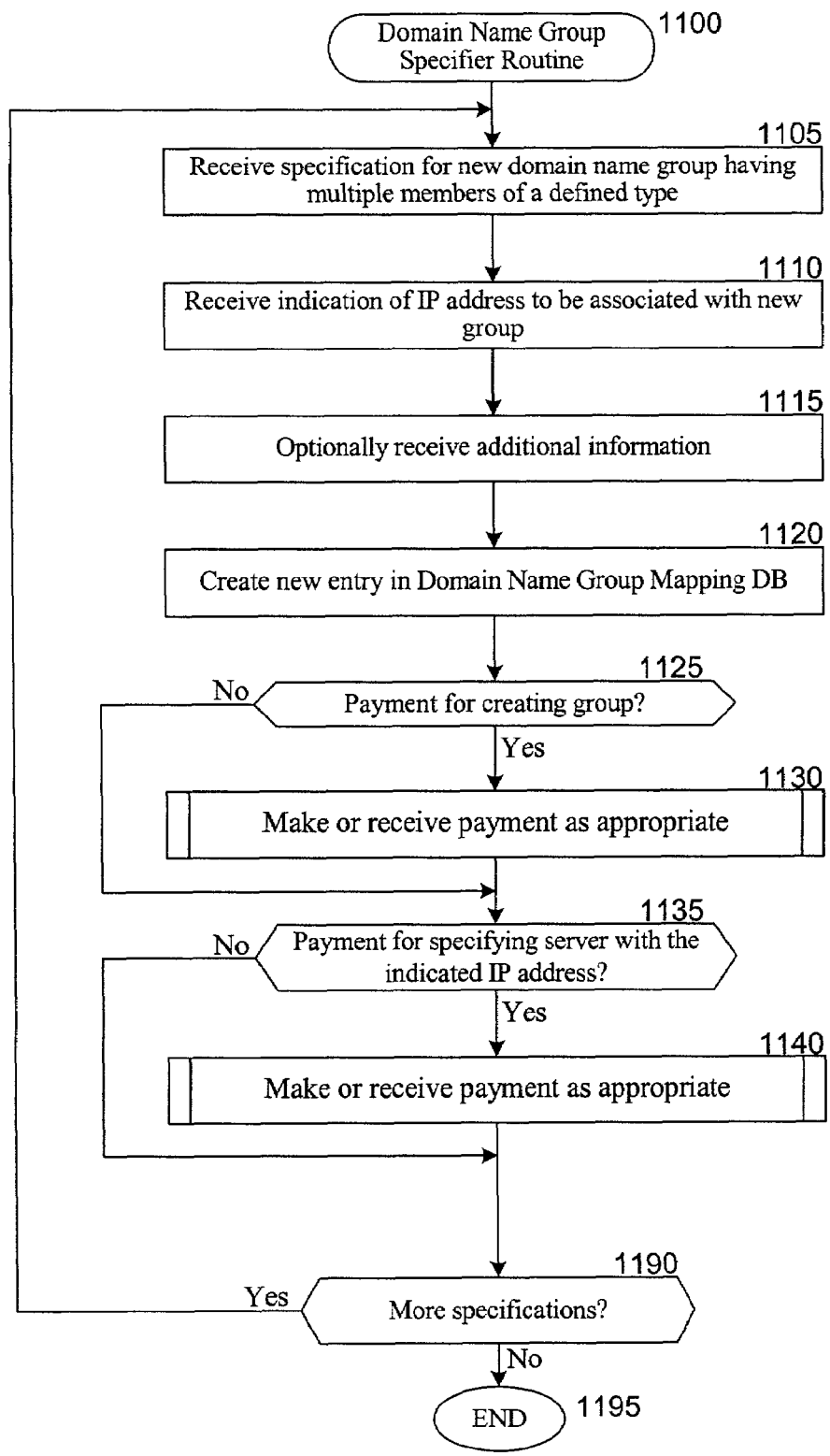
FIG. 11 is a flow diagram of an embodiment of the Domain Name Group Specifier routine.

FIG. 11 is a flow diagram of an embodiment of the Domain Name Group Specifier routine 1100. The routine receives specifications for new domain name groups being defined, creates an appropriate entry in a DSIP Domain Name Group Mapping database, and charges the specifier of the domain name group if appropriate. The routine begins in step 1105 where it receives a specification for a new domain name group that has multiple members of the defined type. The routine then continues to step 1110 where it receives an indication of an IP address to be associated with the new group. The routine then continues to step 1115 where it optionally receives additional information associated with the group, such as a text description or unique group identifier. In step 1120, the routine then creates a new entry in an appropriate DSIP Domain Name Group Mapping database. In step 1125, the routine then determines whether payment is associated with the creating of the group, and if so continues to step 1130 to execute the Payment Processor routine to receive payment as appropriate. After step 1130, or if no payment was associated with creating the group, the routine continues to step 1135 to determine whether payment is associated with the specifying of the DSIP server whose IP address is associated with the group, and if so continues to step 1140 to execute the Payment Processor routine to receive payment as appropriate. After step 1140, or if no payment was associated with the server for the IP address, the routine continues to step 1190 to determine if there are more domain name group specifications to receive. If so, the routine returns to step 1105, and if not the routine continues to step 1195 and ends.

Those skilled in the art will appreciate that this routine or a separate routine could similarly receive specifications for new identifier groups (e.g., of a defined type) and for possible responses for requests for group member identifiers, create appropriate entries in DSIP Identifier URL Response databases, and charge the entities that specify the identifier groups as appropriate.

Those skilled in the art will also appreciate that in some embodiments the functionality provided by the routines discussed above may be provided in alternate ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, those skilled in the art will appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims.

What is claimed is:

1. A method for responding to received messages that identify domain names that are not registered as part of Domain Name System (DNS), the method comprising:

receiving a message that identifies a domain name that is not registered as part of DNS;

detecting an identifier that is part of the identified domain name;

determining that the detected identifier is one of a predefined type from among a plurality of predefined types, the predefined type that corresponds to a group of items, the detected identifier specifying at least one of the items of the group;

determining a service and/or a type of information that is related to the predefined type;

identifying a user preference for processing the predefined type of identifier; and based on the user preference, responding to the received message by providing the determined type of information or performing the determined service.

2. The method of claim 1 wherein the responding to the received message includes providing the determined type of information by identifying a document to provide and by transforming a copy of the identified document before the providing to adapt the copy to an intended recipient.

3. The method of claim 2 wherein the transforming of the copy includes translating content of the copy from one language to another language.

4. The method of claim 2 wherein the transforming of the copy includes modifying a format in which the copy of the document is stored.

5. The method of claim 2 wherein the transforming of the copy includes modifying the copy based on display capabilities of a device on which the copy will be presented.

6. The method of claim 1 wherein the identified domain name is part of a URL indicated by the received message, and wherein the determining of the service and/or of the type of information includes using information other than the identifier that is specified as part of the URL.

7. The method of claim 6 wherein the other specified information is part of a path portion of the URL.

8. The method of claim 6 wherein the identifier is a lower-level portion of the domain name, and wherein the other specified information is part of a distinct lower-level domain name portion of the domain name.

9. The method of claim 1 wherein the received message is an HTTP message, and wherein the determining of the service and/or of the type of information includes using information other than the detected identifier that is included with the HTTP message.

10. The method of claim 9 wherein the other information is values of at least one of multiple HTTP header fields of the HTTP message.

11. The method of claim 9 wherein the other information is part of a cookie included with the HTTP message.

12. The method of claim 1 wherein the determining that the detected identifier is of the predefined type includes determining if the detected identifier is a member of a previously specified group of identifiers each of the predefined type, and including, before the receiving of the message, receiving a request to specify the group of identifiers.

13. The method of claim 12 wherein the request to specify the group of identifiers is received from a third-party entity, and including obtaining payment from the third-party entity for the specifying of the group.

14. The method of claim 12 wherein multiple groups of identifiers each of a distinct predefined type have previously been specified, and wherein the determining that the detected identifier is of the predefined type includes determining if the detected identifier is a member of each of the previously specified groups of identifiers.

15. The method of claim 1 including, before the receiving of the message:

receiving a request to provide an IP address that is associated with the domain name;

determining that the domain name is a member of a previously specified domain name group that includes multiple domain name members each corresponding to identifiers of the predefined type; and responding to the received request to provide the IP address with an IP address that is associated with the domain name group.

16. The method of claim 15 including, after the specifying of the previously specified domain name group:
receiving a request to register an indicated domain name;
determining that the indicated domain name is a member of the domain name group; and
preventing the registering of the indicated domain name based on the determining.

17. The method of claim 15 including:
receiving a request to specify another domain name group;
determining that at least one member domain name of the another domain name group is a registered domain name; and
preventing the specifying of the another domain name group based on the determining.

18. The method of claim 1 wherein the responding to the received message includes providing the determined type of information by identifying a Web page provided by a Web server computer that includes information of the determined type and by an providing an indication of the identified Web page.

19. The method of claim 18 wherein the identifying of the Web page includes identifying multiple Web pages that each include information of the determined type and by selecting one of the multiple Web page based on a characteristic indicated by the detected identifier.

20. The method of claim 1 wherein the message is received from a user, and wherein the determining of the service and/or of the type of information includes using preference information associated with the user.

21. The method of claim 20 including obtaining the preference information by sending a query to the user that indicates multiple type of information choices or multiple service choices that are each related to the predefined type and by receiving a response from the user that includes preference information related to at least one of the multiple indicated choices.

22. The method of claim 1 wherein the determined service and/or the determined type of information is based on the predefined type of the detected identifier and on the items of the group specified by the detected identifier.

23. The method of claim 1 wherein the items of the group include products.

24. The method of claim 1 wherein the items of the group include services.

25. The method of claim 1 wherein the items of the group include locations.

26. The method of claim 1 wherein the items of the group include accessible devices.

27. The method of claim 1 wherein the items of the group include people.

28. The method of claim 1 wherein the predefined type of identifiers are identifiers of a specified length.

29. The method of claim 1 wherein the predefined type of identifiers are identifiers of a specified format.

30. The method of claim 1 wherein the detected identifier is the second-level domain name portion of the identified domain name.

31. The method of claim 1 wherein the detected identifier is multiple lower-level domain name portions of the identified domain name.

32. The method of claim 1 including:
receiving a second message that identifies a second domain name;
detecting a second identifier that is part of the second domain name;
determining that the second identifier is of a second predefined type that corresponds to a second group of items, the second predefined type distinct from the predefined type;
determining a second service or a second type of information that is related to the second predefined type, the second service distinct from the determined service and the second type of information distinct from the type of information; and
responding to the received second message by providing the second type of information or performing the second service.

33. The method of claim 1 wherein the responding to the received message includes providing the determined type of information by identifying multiple Web pages that each include information of the determined type and by generating a Web page that includes information about at least some of the identified Web pages.

34. The method of claim 6 including receiving multiple messages that identify domain names having multiple top-level domain name portions, and wherein the other specified information is the top-level domain name portion of the domain name.

35. The method of claim 1 wherein the responding to the received message includes performing the determined service by identifying an accessible server that performs functionality related to the determined service and by requesting the accessible server to perform the related functionality.

36. The method of claim 1 including, before the receiving of the message:
receiving a request to provide an IP address that is associated with the domain name;
determining that the domain name does not match any entries associated with registered domain names; and
responding to the received request to provide the IP address with an IP address of a server computer capable of responding to received requests for URLs that include domain names that are not registered as part of DNS.

37. A method comprising:
receiving a request from a client to provide an IP address that is associated with a domain name not registered in a Domain Name System (DNS), the domain name including a product information code;
determining that the domain name is not registered within DNS;
identifying multiple domain name groups associated with a top-level domain of the domain name, a first of the domain name groups corresponding to product information codes of a first type, such that each member of the first group has a second-level domain name portion that is a unique product information code of the first type;
determining that the domain name is a member of the first domain name group; and
responding to the received request with an IP address that is associated with the first domain name group, the IP address identifying a server computer capable of providing information and performing services for products identified by product information codes of the first type.

38. The method of claim 37 including receiving a request to specify a new domain name group associated with the top-level domain or to specify a new identifier group associated with the server, and associating the specified new domain name group with the top-level domain or the specified new identifier group with the server.

39. The method of claim 38 wherein the request to specify the new group is received from a third-party entity, and including obtaining payment information from the third-party entity for the associating of the specified new group with the top-level domain or the server.

40. The method of claim 37 further comprising:
identifying Web pages provided by multiple Web server computers that each include information related to products identified by product information codes of the first type, and
providing information about the Web pages to the requesting client.

41. The method of claim 37 wherein the providing includes identifying a Web page provided by a Web server computer that includes information related to products identified by product information codes of the first type, and wherein the provided information is an indication of the identified Web page.

42. The method of claim 37 wherein the providing includes identifying a Web page provided by a Web server computer that includes information related to products identified by product information codes of the first type, wherein the information includes a copy of the identified Web page.

43. The method of claim 37 further comprising identifying another server computer that provides functionality related to the determined service and instructing the another server computer to provide the functionality.

44. The method of claim 37 wherein the URL includes additional specified information related to a service to be performed and a type of information to be provided, and wherein responding to the received request to provide the resource includes using the additional specified information.

45. The method of claim 37 wherein the received request is an HTTP message that includes additional information related to a service to be performed and a type of information to be provided, and wherein the responding to the received request to provide the resource includes using the additional specified information.

46. The method of claim 37 wherein the product information codes are a defined specification for a class of physical items, and wherein the identifier indicates a specific one of the physical items.

47. The method of claim 37 wherein multiple types of information and multiple services are associated with the first type of product information code, further comprising sending a query to the client that indicates the multiple types of information and the multiple services and receiving a response from the client that includes information used to select the determined service and the determined type of information.

48. A computer-readable storage medium embodying contents to cause a computing device to respond to received messages that identify domain names, by performing a method comprising:
receiving a message that identifies a domain name;
detecting an identifier that is part of the identified domain name;
determining that the detected identifier is one of a predefined type from among a plurality of predefined types, the predefined type that corresponds to a group of items;
determining a service or a type of information that is related to the predefined type;
determining a user preference defining a method of processing the predefined type of identifier;
responding to the received message by providing the determined type of information or performing the determined service using a resource specified by the user preference.

49. The computer-readable medium of claim 48 wherein the detected identifier specifies at least one of the items of the group, and wherein the determined service or the determined type of information is based on the predefined type of the detected identifier and on the items of the group specified by the detected identifier.

50. The computer-readable medium of claim 48 wherein the responding to the received message includes providing the determined type of information by identifying a document to provide and by transforming a copy of the identified document before the providing to adapt the copy to an intended recipient.

51. The computer-readable medium of claim 48 wherein the message is received from a user, and wherein the determining of the service or of the type of information includes using preference information associated with the user.

52. The computer-readable medium of claim 48 wherein the contents further cause the computing device to respond to received messages that identify domain names by, before the receiving of the message, performing a method comprising:
receiving a request to provide an IP address that is associated with the domain name;
determining that the domain name is a member of a previously specified domain name group that includes multiple domain name members each corresponding to identifiers of the predefined type; and
responding to the received request to provide the IP address with an IP address that is associated with the domain name group.

53. The computer-readable medium of claim 48 wherein the computer-readable medium is a memory of a computer system.

54. A method for responding to received requests for URLs that identify domain names, the method comprising:
receiving from a client a request corresponding to a URL that identifies a domain name that is not registered as part of DNS;
if the URL corresponds to an available resource, providing access to the resource to the client;
if the URL does not correspond to an available resource, determining if the domain name includes an identifier of a predefined type from among a plurality of predefined types; and
if the domain name includes an identifier of a predefined type, determining a service or a type of information that is related to the predefined type; and
responding to the received request by providing the determined type of information or performing the determined service.

55. A method for responding to received messages that identify domain names that include numeric identifiers that are members of a predefined group of numeric identifiers, the method comprising:
responding to a received first message from a first client that identifies a first domain name that is not registered as part of DNS by,
detecting a first numeric identifier included in the first identified domain name that is a member of a predefined group of numeric identifiers;

determining a first type of service or a first type of information from among a plurality of types of services or types of information that is related to the predefined group; and providing the first type of information to the first client or performing the first type of service for the first client; and responding to a received second message from a second client that identifies a second domain name by, detecting a second numeric identifier included in the second identified domain name that is also a member of the predefined group of numeric identifiers, the second numeric identifier distinct from the first numeric identifier; and providing the first type of information to the second client or performing the first type of service for the second client.

56. A method for responding to received requests that indicate URLs with domain names that include identifiers of a predefined type, the method comprising:

receiving a request that indicates a URL with a domain name that is not registered as part of DNS and includes an identifier of the predefined type from among a plurality of predefined types;

determining that the included identifier is one of the predefined types;

determining a service or a type of information that is related to the predefined type; and responding to the received request by providing the determined type of information or performing the determined service.

\* \* \* \* \*